(12) United States Patent
Watanabe et al.

(10) Patent No.: US 10,073,571 B2
(45) Date of Patent: Sep. 11, 2018

(54) TOUCH SENSOR AND TOUCH PANEL INCLUDING CAPACITOR

(71) Applicant: Semiconductor Energy Laboratory Co., Ltd., Atsugi-shi, Kanagawa-ken (JP)

(72) Inventors: Kazunori Watanabe, Kanagawa (JP); Hiroyuki Miyake, Kanagawa (JP); Yuji Iwaki, Kanagawa (JP); Hideaki Shishido, Kanagawa (JP); Kouhei Toyotaka, Kanagawa (JP); Koji Kusunoki, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 417 days.

(21) Appl. No.: 14/691,933

(22) Filed: Apr. 21, 2015

(65) Prior Publication Data

US 2015/0317020 A1 Nov. 5, 2015

(30) Foreign Application Priority Data

May 2, 2014 (JP) .................................. 2014-095046

(51) Int. Cl.
*G06F 3/041* (2006.01)
*G06F 3/044* (2006.01)
*G02F 1/1333* (2006.01)

(52) U.S. Cl.
CPC .......... *G06F 3/044* (2013.01); *G02F 1/13338* (2013.01); *G06F 3/0412* (2013.01); *G06F 2203/04102* (2013.01)

(58) Field of Classification Search
CPC .................. G06F 3/044; G06F 3/0412; G06F 2203/04102; G06F 2203/04103; G06F 2203/04112; G02F 1/13338
USPC ........ 345/173–174; 178/18.01, 18.03, 18.06, 178/18.07
See application file for complete search history.

(56) References Cited

U.S. PATENT DOCUMENTS

| 8,243,027 B2 | 8/2012 | Hotelling et al. |
| 8,367,440 B2 | 2/2013 | Takayama et al. |
| 8,415,208 B2 | 4/2013 | Takayama et al. |
| 9,082,678 B2 | 7/2015 | Yamazaki et al. |
| 2005/0200292 A1 | 9/2005 | Naugler, Jr. et al. |

(Continued)

FOREIGN PATENT DOCUMENTS

| JP | 2003-174153 A | 6/2003 |
| JP | 2003-196023 A | 7/2003 |
| JP | 2009-003916 A | 1/2009 |

*Primary Examiner* — Rodney Amadiz
(74) *Attorney, Agent, or Firm* — Fish & Richardson P.C.

(57) ABSTRACT

To increase the detection sensitivity of a touch panel, increase the visibility of a touch panel, provide a bendable touch panel, provide a thin touch panel, or provide a lightweight touch panel. The touch sensor has a first substrate, a first conductive layer, a second conductive layer, and an insulating layer. The first conductive layer includes a region between the first substrate and the second conductive layer. The insulating layer includes a region between the first conductive layer and the second conductive layer. The first conductive layer, the second conductive layer, and the insulating layer form a capacitor. The second conductive layer has an opening. The opening in the second conductive layer and the first conductive layer overlap with each other in a region.

18 Claims, 16 Drawing Sheets

(56) References Cited

U.S. PATENT DOCUMENTS

| | | |
|---|---|---|
| 2006/0097991 A1 | 5/2006 | Hotelling et al. |
| 2006/0250373 A1* | 11/2006 | Sakurai .................. G06F 3/044 345/173 |
| 2009/0046077 A1 | 2/2009 | Tanaka et al. |
| 2009/0085891 A1 | 4/2009 | Yang et al. |
| 2010/0163874 A1 | 7/2010 | Koyama et al. |
| 2010/0300862 A1 | 12/2010 | Tamura et al. |
| 2011/0216043 A1 | 9/2011 | Tamura et al. |
| 2011/0267297 A1 | 11/2011 | Yamazaki et al. |
| 2012/0001874 A1 | 1/2012 | Kurokawa et al. |
| 2012/0249454 A1 | 10/2012 | Teraguchi et al. |
| 2013/0044384 A1* | 2/2013 | Kim .......................... B05D 5/06 359/885 |
| 2013/0075739 A1 | 3/2013 | Loy et al. |
| 2013/0082970 A1 | 4/2013 | Frey et al. |
| 2013/0135548 A1* | 5/2013 | Burberry ................ G06F 3/044 349/38 |
| 2013/0194671 A1 | 8/2013 | Dai et al. |
| 2013/0214324 A1 | 8/2013 | Takayama et al. |
| 2014/0008668 A1 | 1/2014 | Hirakata |
| 2014/0014960 A1 | 1/2014 | Yamazaki et al. |
| 2014/0063364 A1 | 3/2014 | Hirakata |
| 2014/0063368 A1 | 3/2014 | Yamazaki et al. |
| 2014/0063719 A1 | 3/2014 | Yamazaki et al. |
| 2014/0085277 A1 | 3/2014 | Iwaki |
| 2014/0104508 A1 | 4/2014 | Yamazaki et al. |
| 2014/0125880 A1* | 5/2014 | Tsai ...................... G06F 3/0412 349/12 |
| 2014/0306260 A1 | 10/2014 | Yamazaki et al. |
| 2014/0357019 A1 | 12/2014 | Koyama et al. |
| 2014/0361980 A1 | 12/2014 | Iwaki et al. |
| 2014/0375660 A1 | 12/2014 | Tamaki |
| 2015/0009128 A1 | 1/2015 | Matsumoto |
| 2015/0062525 A1 | 3/2015 | Hirakata |
| 2015/0138072 A1 | 5/2015 | Yamazaki et al. |
| 2015/0144920 A1 | 5/2015 | Yamazaki et al. |
| 2015/0153861 A1 | 6/2015 | Yamazaki et al. |
| 2015/0153862 A1 | 6/2015 | Nakamura et al. |
| 2015/0154730 A1 | 6/2015 | Hirakata et al. |
| 2015/0177789 A1 | 6/2015 | Jinbo |
| 2015/0255518 A1 | 9/2015 | Watanabe et al. |
| 2015/0261333 A1 | 9/2015 | Kaneyasu et al. |

* cited by examiner

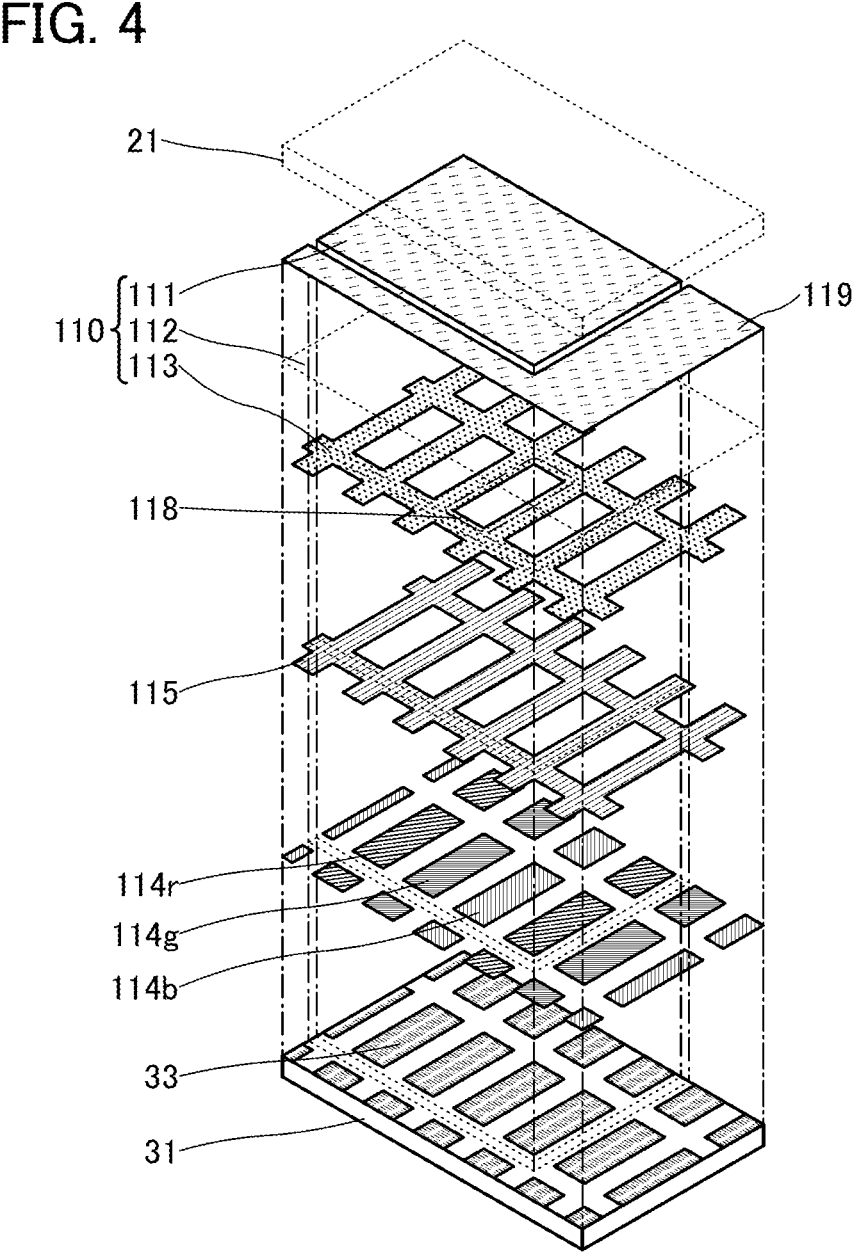

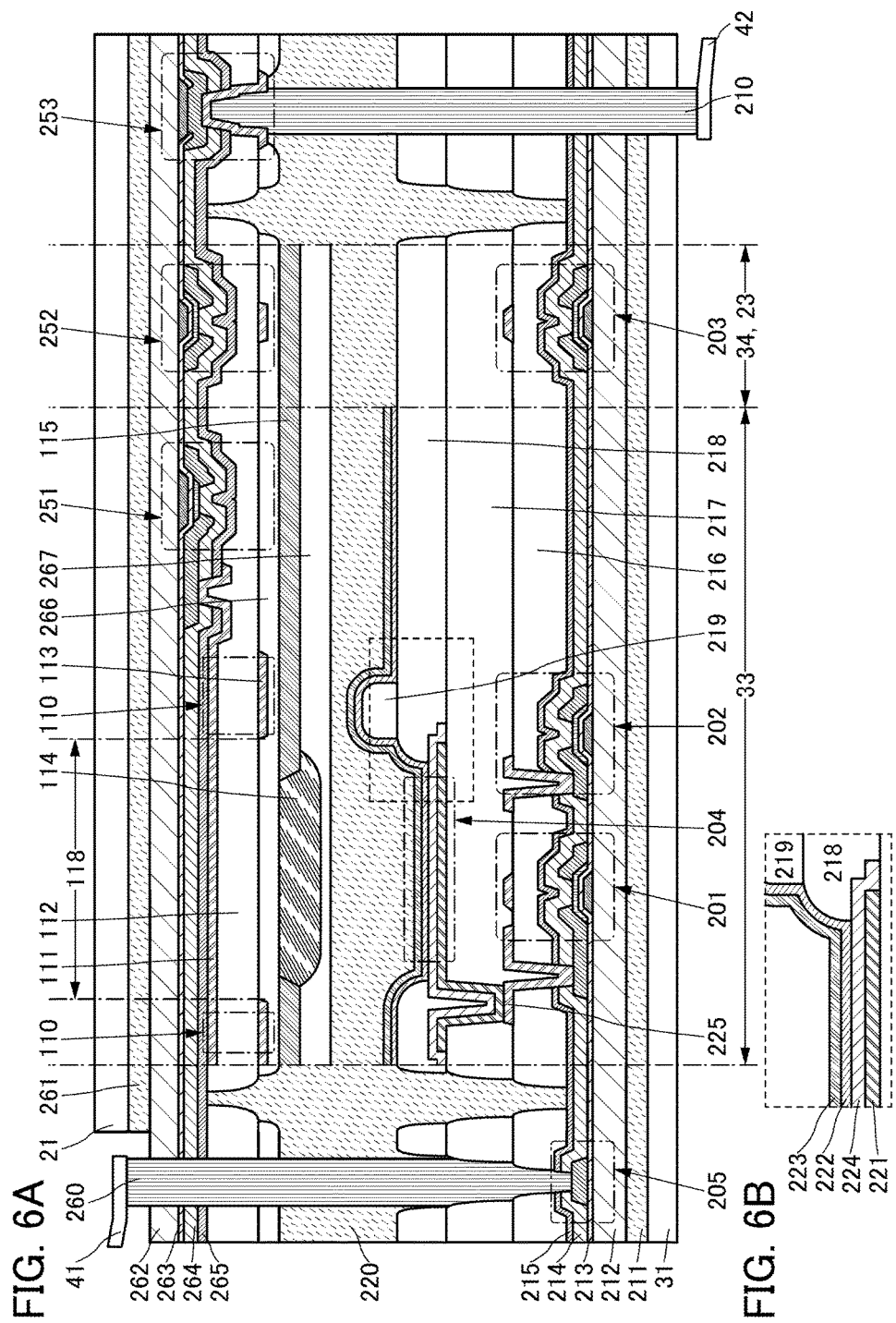

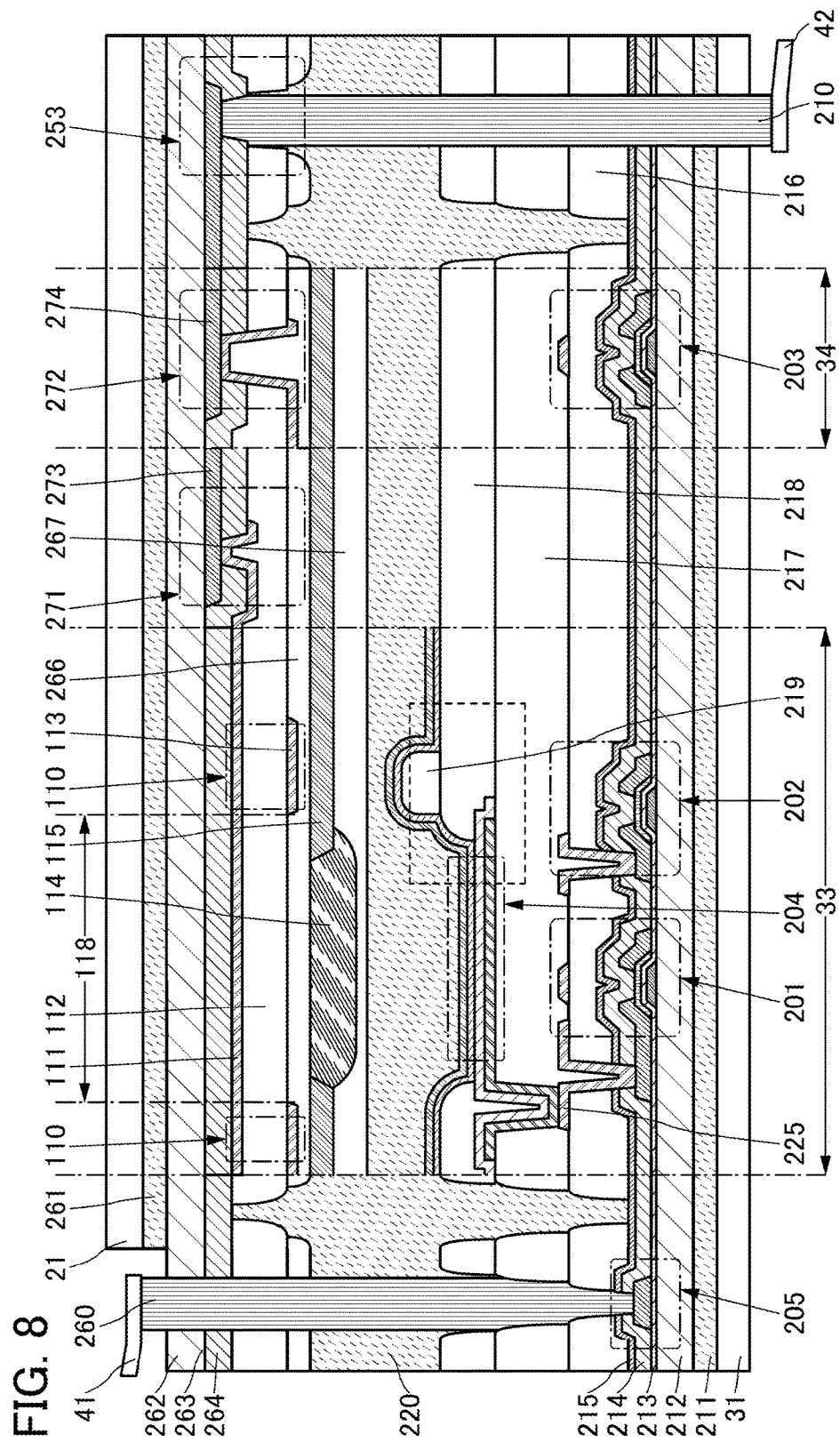

FIG. 9A
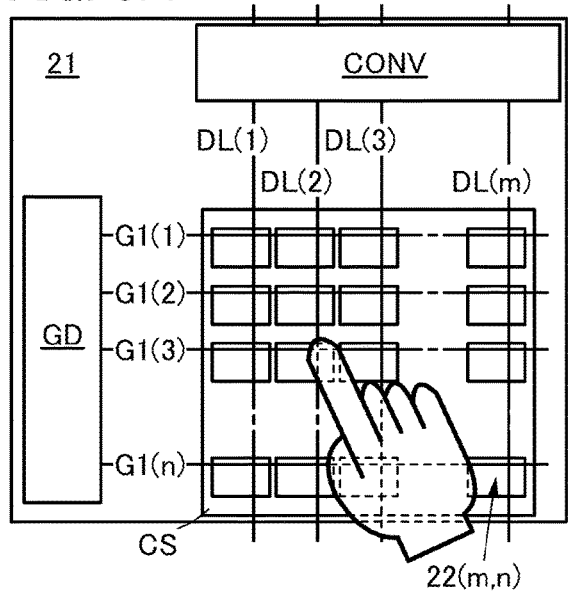
FIG. 9B
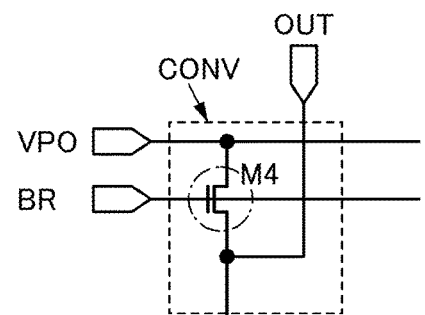
FIG. 9C
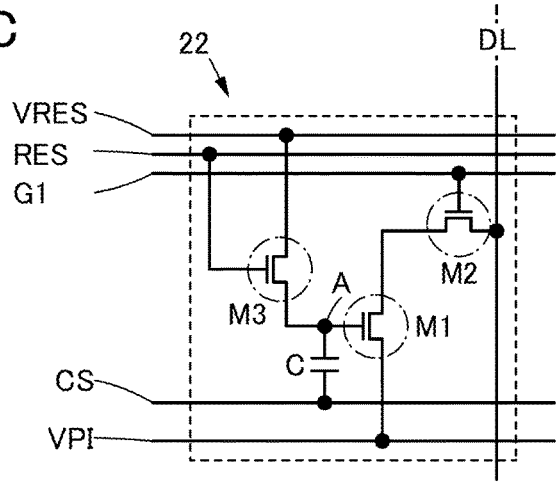
FIG. 9D1
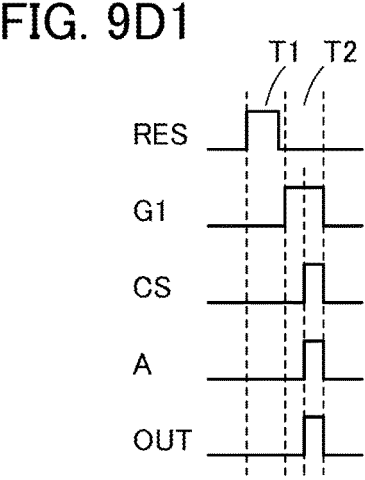
FIG. 9D2
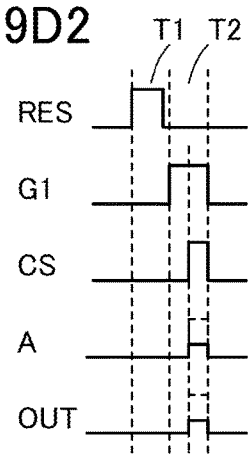

FIG. 10A
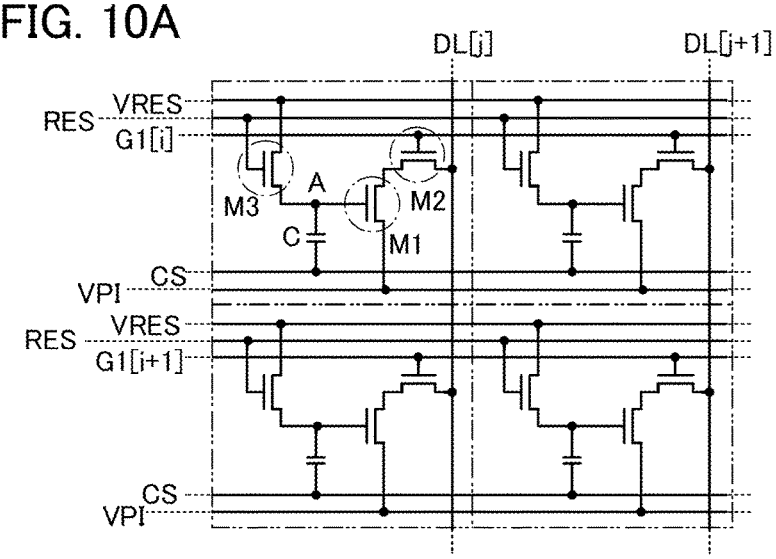
FIG. 10B
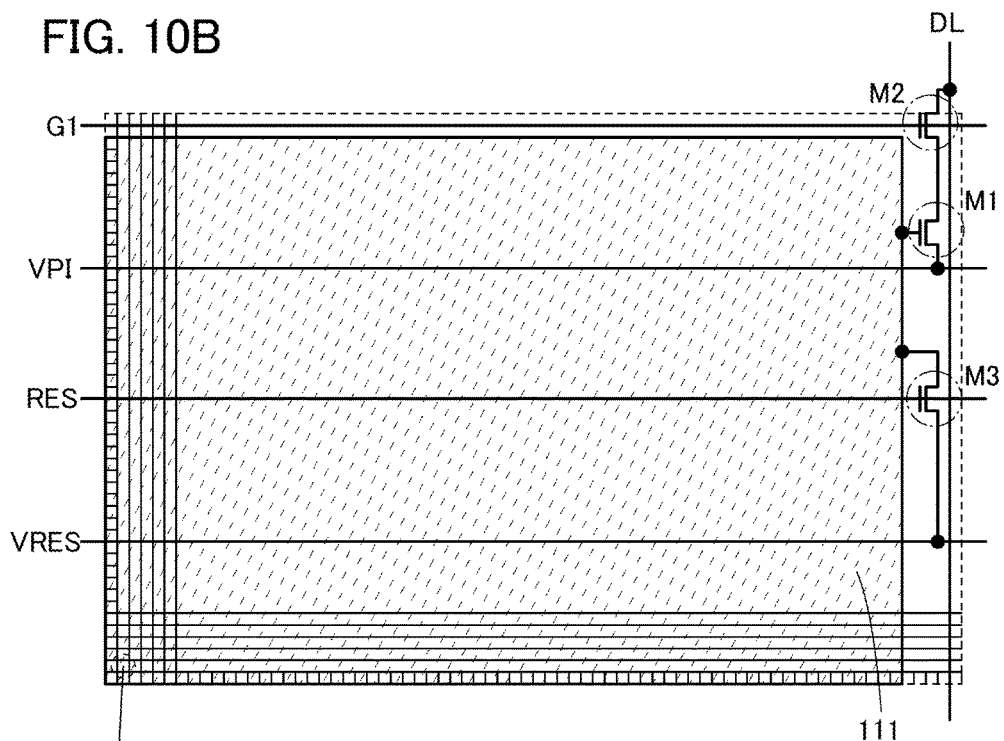
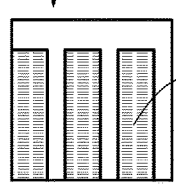
FIG. 10C

TOUCH SENSOR AND TOUCH PANEL INCLUDING CAPACITOR

BACKGROUND OF THE INVENTION

1. Field of the Invention

One embodiment of the present invention relates to a touch sensor or a flexible touch sensor. Alternatively, one embodiment of the present invention relates to a touch panel or a flexible touch panel.

Note that one embodiment of the present invention is not limited to the above technical field. One embodiment of the invention disclosed in this specification and the like relates to an object, a method, or a manufacturing method. One embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, an electronic device, a lighting device, an input device, an input/output device, a method for driving any of them, and a method for manufacturing any of them.

In this specification and the like, a semiconductor device generally means a device that can function by utilizing semiconductor characteristics. A semiconductor element such as a transistor, a semiconductor circuit, an arithmetic device, and a memory device are each an embodiment of a semiconductor device. An imaging device, a display device, a liquid crystal display device, a light-emitting device, an electro-optical device, a power generation device (including a thin film solar cell, an organic thin film solar cell, and the like), and an electronic device may each include a semiconductor device.

2. Description of the Related Art

Recent display devices are expected to be applied to a variety of uses and become diversified. For example, a smartphone and a tablet with a touch panel are being developed as portable information appliances.

Patent Document 1 discloses a flexible active matrix light-emitting device in which an organic EL element and a transistor serving as a switching element are provided over a film substrate.

REFERENCE

Patent Document

[Patent Document 1] Japanese Published Patent Application No. 2003-174153

SUMMARY OF THE INVENTION

What is desirable is a touch panel in which a display panel is provided with a function of inputting data with a finger, a stylus, or the like touching a screen as a user interface.

For example, in a touch panel, a touch sensor can be provided on the viewer side of a display panel. It is desirable that the touch sensor provided in the touch panel have high detection sensitivity. The touch sensor is provided to overlap with the display panel; therefore, in some cases, visibility decreases as compared to the case where the touch sensor is not provided.

One object of one embodiment of the present invention is to improve detection sensitivity of a touch panel. Another object is to improve visibility of a touch panel. Another object is to provide a thin touch panel. Another object is to provide a bendable touch panel. Another object is to provide a lightweight touch panel. Another object is to provide a touch panel with high reliability.

Another object is to provide a novel input device. Another object is to provide a novel input/output device.

Note that the descriptions of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is a touch sensor including a first substrate, a first conductive layer, a second conductive layer, and an insulating layer. The first conductive layer includes a region between the first substrate and the second conductive layer. The insulating layer includes a region between the first conductive layer and the second conductive layer. The first conductive layer, the second conductive layer, and the insulating layer form a capacitor. The second conductive layer has an opening. The opening in the second conductive layer and the first conductive layer overlap with each other in a region.

In the above structure, it is preferable that a first transistor electrically connected to the first conductive layer be included.

Another embodiment of the present invention is a touch panel including the touch sensor, a second substrate, a display element, a first layer, and a second layer. The second substrate has a region overlapping with the first substrate. The display element, the first layer, and the second layer are between the first substrate and the second substrate. The first layer has a function of transmitting light in a specific wavelength range and has a region overlapping with the display element. The second layer has a function of blocking visible light. The first conductive layer has a region overlapping with the first layer and a region overlapping with the second layer. The second conductive layer has a region overlapping with the second layer. A region where an opening in the second conductive layer and the display element overlap with each other is included. The opening in the second conductive layer and the first layer overlap with each other in a region.

In the above structure, it is preferable that the display element be a light-emitting element.

In the above structure, it is preferable that the first substrate and the second substrate each have flexibility.

Another embodiment of the present invention is a touch sensor module including the touch sensor and a first flexible printed circuit (FPC). The first FPC has a function of supplying a signal to at least one of the first conductive layer and the second conductive layer.

Another embodiment of the present invention is a touch panel module including the touch panel, a second FPC, and a third FPC. The second FPC has a function of supplying a signal to at least one of the first conductive layer and the second conductive layer. The third FPC has a function of supplying a signal to the display element.

Another embodiment of the present invention is an electronic device in which the touch sensor module or the touch panel module is incorporated in a housing.

According to one embodiment of the present invention, detection sensitivity of a touch panel can be improved, visibility of a touch panel can be improved, a thin touch panel can be provided, a lightweight touch panel can be provided, or a touch panel with high reliability can be provided.

A novel input device can be provided, or a novel input/output device can be provided. Note that the description of these effects does not disturb the existence of other effects. One embodiment of the present invention does not necessarily achieve all the effects listed above. Other effects will be apparent from and can be derived from the description of the specification, the drawings, the claims, and the like.

BRIEF DESCRIPTION OF THE DRAWINGS

FIG. 4 shows a structure example of a stacked-layer structure included in a touch panel module of an embodiment.

FIGS. 6A and 6B show a structure example of a touch panel module of an embodiment.

FIG. 8 shows a structure example of a touch panel module of an embodiment.

FIGS. 9A, 9B, 9C, 9D-1, and 9D-2 are a block diagram, circuit diagrams, and timing charts of a touch panel of an embodiment.

FIGS. 10A to 10C are a circuit diagram and schematic views of a structure included in a touch panel of an embodiment.

DETAILED DESCRIPTION OF THE INVENTION

Figure 1A:
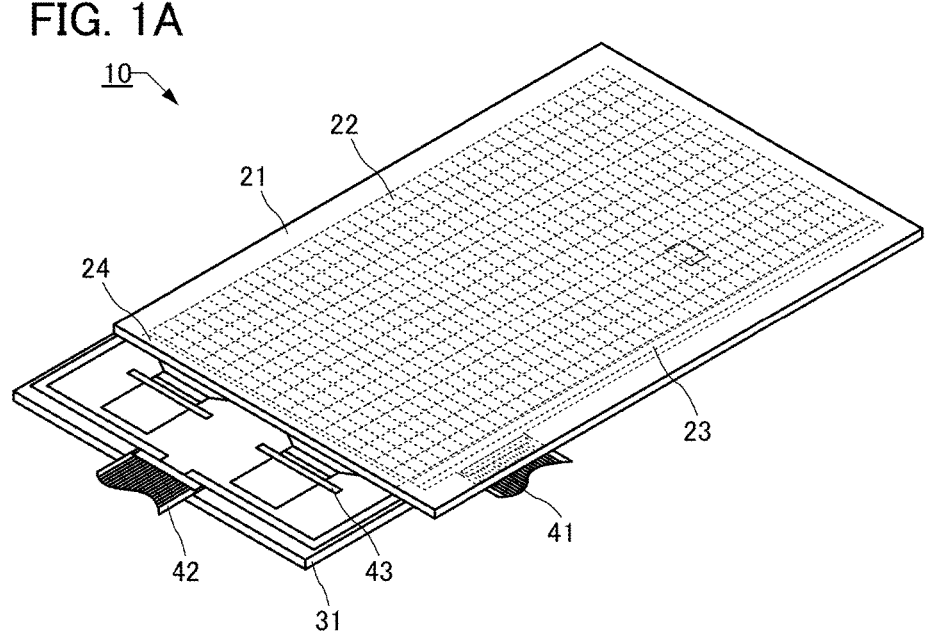
FIGS. 1A and 1B show a structure example of a touch panel module of an embodiment.

Embodiments will be described in detail with reference to drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments below.

Note that in the structures of the invention described below, the same portions or portions having similar functions are denoted by the same reference numerals in different drawings, and description of such portions is not repeated. Further, the same hatching pattern is applied to portions having similar functions, and the portions are not especially denoted by reference numerals in some cases.

Note that in each drawing described in this specification, the size, the layer thickness, or the region of each component is exaggerated for clarity in some cases. Therefore, embodiments of the present invention are not limited to such a scale.

Note that in this specification and the like, ordinal numbers such as "first", "second", and the like are used in order to avoid confusion among components and do not limit the number.

A transistor is a kind of semiconductor elements and can achieve amplification of current or voltage, switching operation for controlling conduction or non-conduction, or the like. A transistor in this specification includes an insulated-gate field effect transistor (IGFET) and a thin film transistor (TFT).

Note that the terms "film" and "layer" can be interchanged with each other depending on the case or circumstances. For example, the term "conductive layer" can be changed into the term "conductive film" in some cases. Also, the term "insulating film" can be changed into the term "insulating layer" in some cases.

Embodiment 1

In this embodiment, structure examples of a touch sensor, a touch sensor module provided with a touch sensor, a touch panel, a touch panel module, and the like of one embodiment of the present invention are described. In the description below, a capacitive type touch sensor is used as a touch sensor.

Note that in this specification and the like, an object in which a connector such as an FPC or a tape carrier package (TCP) is attached to a substrate provided with a touch sensor, or an object in which an integrated circuit (IC) is directly mounted on a substrate by a chip on glass (COG) method is referred to as a touch sensor module in some cases. Furthermore, a device having a function as a touch sensor and a function of displaying an image or the like is referred to as a touch panel (an input/output device) in some cases. Note that an object in which the connector is attached to a touch panel or an object on which an IC is mounted on a touch panel is referred to as a touch panel module or simply referred to as a touch panel in some cases.

A capacitive type touch sensor that can be used for one embodiment of the present invention includes a capacitor. The capacitor can have a stacked-layer structure of a first conductive layer, a second conductive layer, and an insulating layer provided between the first conductive layer and the second conductive layer, for example. At this time, the first conductive layer and the second conductive layer each function as an electrode of the capacitor. The insulating layer functions as a dielectric.

Of the first conductive layer and the second conductive layer, the first conductive layer is assumed to be provided on the touch surface (the detection surface) side. In the touch sensor of one embodiment of the present invention, a capacitor formed between an object to be detected such as a finger or a stylus and the first conductive layer is detected to detect touch motion. Specifically, by detecting a change in the potential of the first conductive layer due to a capacitor formed by touch motion when a predetermined potential difference is applied between the first conductive layer and the second conductive layer, the touch motion can be detected.

Here, in a region of the touch sensor that has a function of detecting a touch, the area of the first conductive layer is preferably larger than the area of the second conductive layer. Thus, a capacitance of a capacitor formed between the first conductive layer and the second conductive layer can be reduced. Furthermore, by increasing the electrode area of the first conductive layer, a capacitance of a capacitor formed between the object to be detected and the first conductive layer can be increased. As a result, a change in the potential of the first conductive layer at the time of the touch motion is increased; thus, detection sensitivity can be increased.

For example, it is preferable that the second conductive layer have an opening and the first conductive layer and the second conductive layer be provided so that the opening and the first conductive layer overlap with each other. By changing the area and the number of openings provided in the second conductive layer, a capacitance of a capacitor formed between the first conductive layer and the second conductive layer can be changed easily without changing the thickness and the material of the insulating layer.

Furthermore, the touch sensor of one embodiment of the present invention can overlap with a display panel including a pixel having a display element to form a touch panel. At this time, the opening of the second conductive layer is provided to overlap with the display element, in which case light emitted from the display element does not need to pass through the second conductive layer. This can improve the luminance and the visibility of an image displayed on the touch panel. In the case where the touch panel includes a color filter (also referred to as a coloring layer) overlapping with the display element and a light-blocking layer provided between adjacent color filters, it is preferable that the second conductive layer overlap with the light-blocking layer and the opening of the second conductive layer overlap with the color filter.

At this time, a substrate supporting the touch sensor and a substrate supporting the display element are preferably provided to face each other. In the touch sensor included in the touch panel of one embodiment of the present invention, the area of the second conductive layer provided on the display element side is small; therefore, the touch sensor is not likely to be affected by noise that is generated when the display element is driven. Thus, a decrease in detection sensitivity can be suppressed even in the structure in which the touch sensor and the display element are provided between the two substrates to be close to each other. As a result, the thickness of the touch panel can be reduced. In particular, in the case where a flexible material is used for the pair of substrates, a flexible touch panel that is thin and lightweight can be obtained.

A more specific structure example of one embodiment of the present invention is described below with reference to drawings.

Structure Example

Figure 1B:
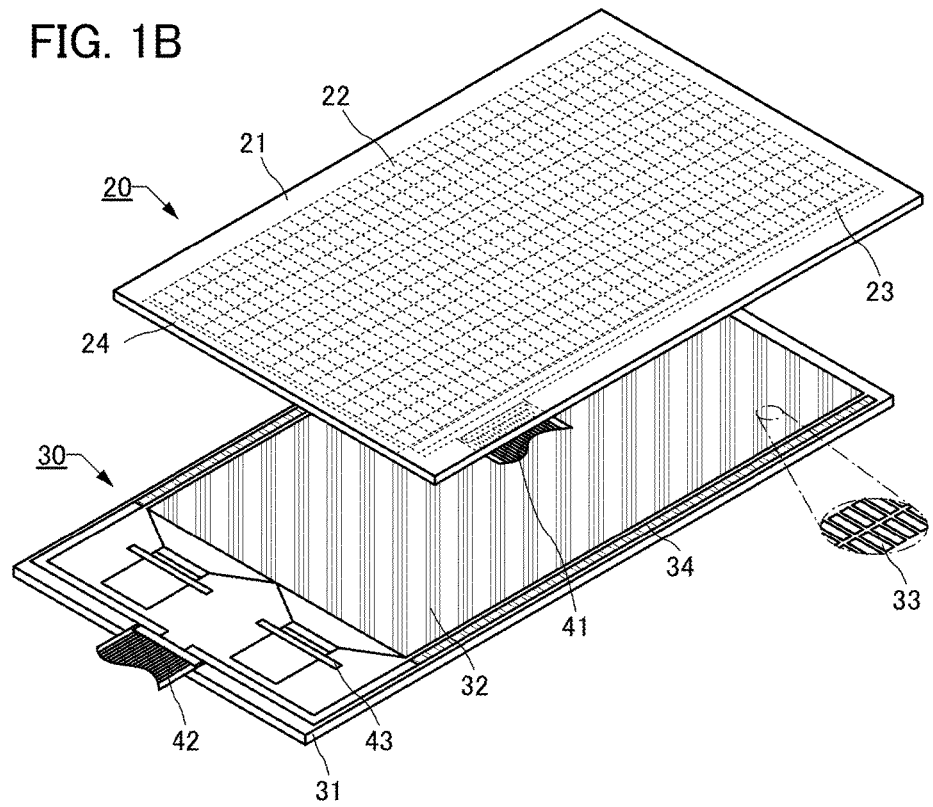

FIG. 1A is a schematic perspective view of a touch panel module 10 of one embodiment of the present invention. FIG. 1B is a developed view of the schematic perspective view of the touch panel module 10. In the touch panel module 10, a touch sensor module 20 and a display panel 30 are provided to overlap with each other.

In the touch sensor module 20, an FPC 41 is provided for a touch sensor including a sensor element (also referred to as a sensing element) 22 over a first substrate 21. A plurality of sensor elements 22 is arranged in a matrix over the first substrate 21. Circuits 23 and 24 electrically connected to the sensor elements 22 are preferably provided over the first substrate 21. A circuit having a function of selecting a plurality of sensor elements 22 can be used for at least one of the circuits 23 and 24. A circuit having a function of outputting a signal from the sensor element 22 can be used for at least one of the circuits 23 and 24. The FPC 41 has a function of supplying a signal from the outside to at least one of the circuits 23 and 24 and the sensor element 22. Furthermore, the FPC 41 has a function of outputting a signal from at least one of the circuits 23 and 24 and the sensor element 22 to the outside.

In the display panel 30, a display portion 32 is provided over a second substrate 31. The display portion 32 includes a plurality of pixels 33 arranged in a matrix. A circuit 34 electrically connected to the pixel 33 in the display portion 32 is preferably provided over the second substrate 31. For example, a circuit functioning as a gate driver circuit can be used for the circuit 34. An FPC 42 has a function of supplying a signal from the outside to at least one of the display portion 32 and the circuit 34. In FIGS. 1A and 1B, a terminal 43 is provided for the second substrate 31. An FPC can be attached to the terminal 43, an IC functioning as a source driver circuit can be directly mounted on the terminal 43 by a COG method or a COF method, or an FPC, a TAB, a TCP, or the like on which an IC is mounted can be attached to the terminal 43, for example. Note that a module in which an IC or a connector such as an FPC is mounted on the display panel 30 can be referred to as a display panel module.

In the touch panel module 10 of one embodiment of the present invention, the plurality of sensor elements 22 can output positional information based on the change in capacitance at the time of the touch motion. Furthermore, the display portion 32 can display an image.

[Stacked-Layer Structure Included in Touch Panel]

Figure 2A:
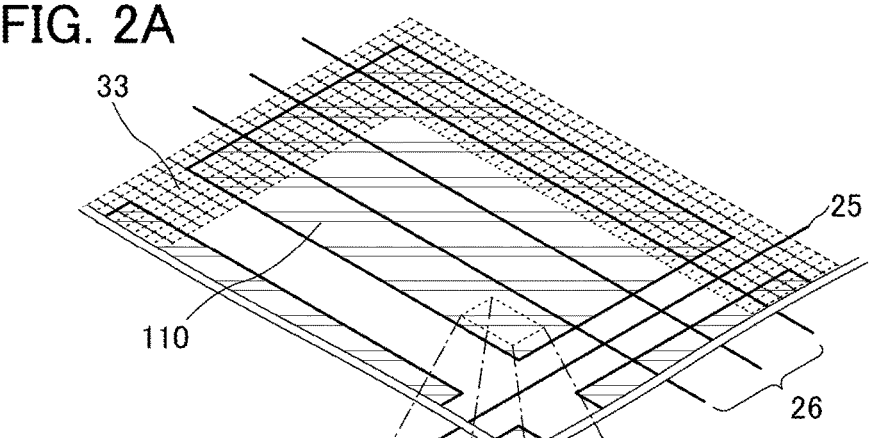
FIGS. 2A and 2B show a structure example of a stacked-layer structure included in a touch panel module of an embodiment.

FIG. 2A is an enlarged schematic view of a region surrounded by a dashed line in FIG. 1A.

FIG. 2A shows an example in which a capacitor 110 included in the sensor element 22 shown in FIG. 1A, the pixel 33, a wiring 25, and wirings 26 are provided.

A plurality of capacitors 110 is arranged in a matrix. The wiring 25 is provided between two adjacent capacitors 110. A plurality of wirings 26 is provided in a direction crossing the wiring 25.

A plurality of pixels 33 is arranged in a matrix. In the plurality of pixels 33, some pixels are provided to overlap with the capacitor 110, and others are provided to overlap with a region between two adjacent capacitors 110.

The pixel 33 includes at least a display element. As the display element, a light-emitting element such as an organic electroluminescence (EL) element is preferably used. Other than the organic EL element, any of various display elements such as display elements (electronic ink) that perform display by an electrophoretic method, an electronic liquid powder (registered trademark) method, an electrowetting method, or the like; MEMS shutter display elements; optical interference type MEMS display elements; and liquid crystal elements can be used as the display element.

Furthermore, this embodiment can be used in a transmissive liquid crystal display, a transflective liquid crystal display, a reflective liquid crystal display, a direct-view liquid crystal display, or the like. In the case of a transflective liquid crystal display or a reflective liquid crystal display, some of or all of pixel electrodes function as reflective electrodes. For example, some of or all of pixel electrodes are formed to contain aluminum, silver, or the like. In such a case, a memory circuit such as an SRAM can be provided under the reflective electrodes, which leads to lower power consumption. A structure suitable for employed display elements can be selected from among a variety of structures of pixel circuits.

Figure 2B:
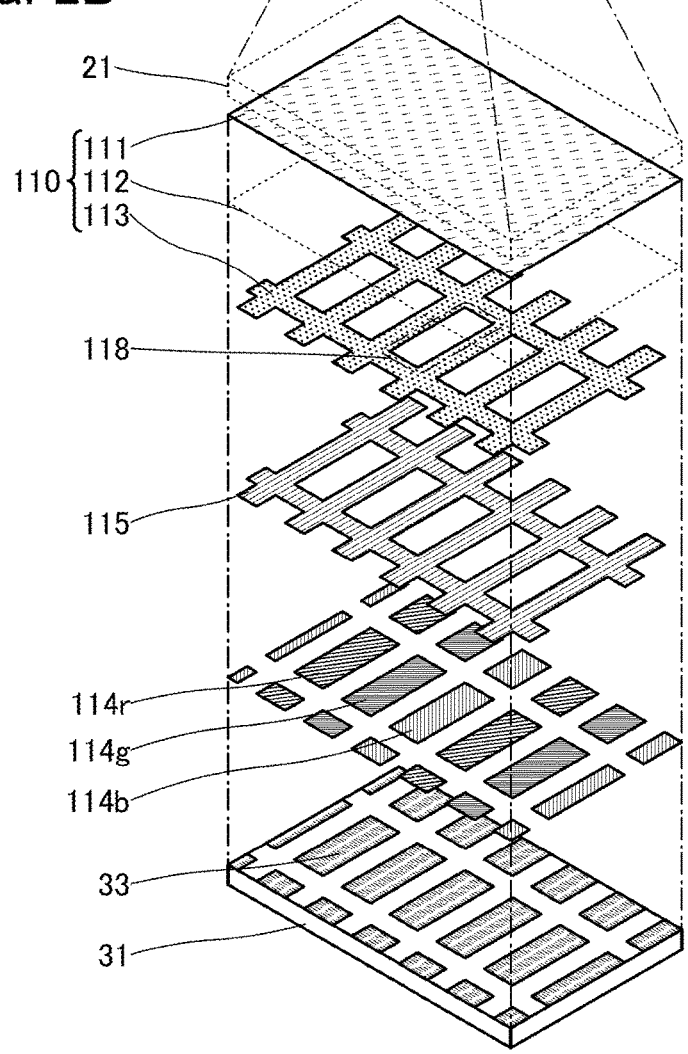

FIG. 2B is a developed schematic view of a stacked-layer structure in a region overlapping with the capacitor 110. As shown in FIG. 2B, a first conductive layer 111, an insulating layer 112, a second conductive layer 113, a light-blocking layer 115, coloring layers 114r, 114g, and 114b, and pixels 33 are provided between the first substrate 21 and the second substrate 31.

Note that in the case of describing common points of the coloring layers 114r, 114g, and 114b without distinguishing from one another, they are in some cases simply referred to as the coloring layers 114.

The first conductive layer 111, the second conductive layer 113, and the insulating layer 112 provided between the first conductive layer 111 and the second conductive layer 113 form the capacitor 110.

Each coloring layer 114 has a function of transmitting light in a particular wavelength range. Here, the coloring layer 114r transmits red light, the coloring layer 114g transmits green light, and the coloring layer 114b transmits blue light. The pixel 33 and one of the coloring layers 114 are provided to overlap with each other, whereby only light in a particular wavelength range in light emitted from the pixels 33 can be transmitted to the first substrate 21 side.

The light-blocking layer 115 has a function of blocking visible light. The light-blocking layer 115 is provided to overlap with a region between two adjacent coloring layers 114. In the example shown in FIG. 2B, the light-blocking layer 115 has an opening provided to overlap with the pixel 33 and the coloring layer 114.

Note that in FIG. 2B, the light-blocking layer 115 is provided closer to the first substrate 21 side than the coloring layer 114 is; however, the coloring layer 114 may be provided closer to the first substrate 21 side than the light-blocking layer 115 is.

The first conductive layer 111 and the insulating layer 112 each have a region overlapping with the pixel 33 and the coloring layer 114. Therefore, a material that transmits visible light is preferably used for each of the first conductive layer 111 and the insulating layer 112.

The second conductive layer 113 has a plurality of openings 118. Accordingly, the area where the first conductive layer 111 and the second conductive layer 113 overlap with each other can be reduced. As shown in FIG. 2B, the opening 118 in the second conductive layer 113 is preferably provided to overlap with the pixel 33. Furthermore, the second conductive layer 113 is preferably provided to overlap with the light-blocking layer 115. Thus, light is emitted from the pixel 33 to the first substrate 21 side without passing through the second conductive layer 113, so that a decrease in luminance can be suppressed, and a touch panel with higher visibility can be obtained. Furthermore, a touch panel with low power consumption can be obtained because light extraction efficiency is increased.

Figure 3A:
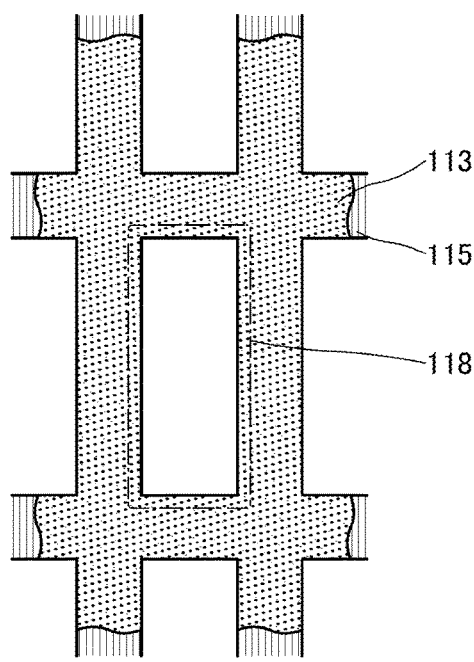
FIGS. 3A to 3C each show a structure example of a stacked-layer structure included in a touch panel module of an embodiment.
Figure 3B:
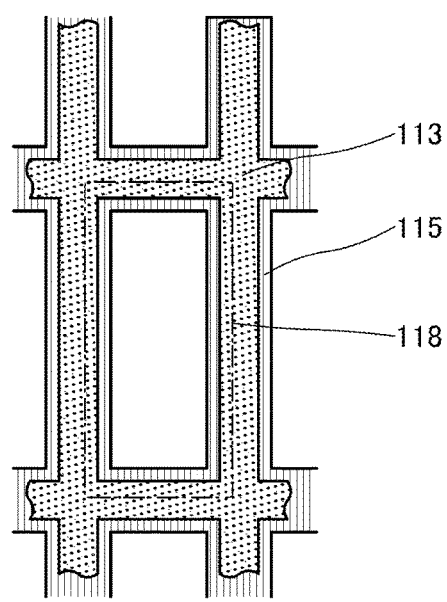
Figure 3C:
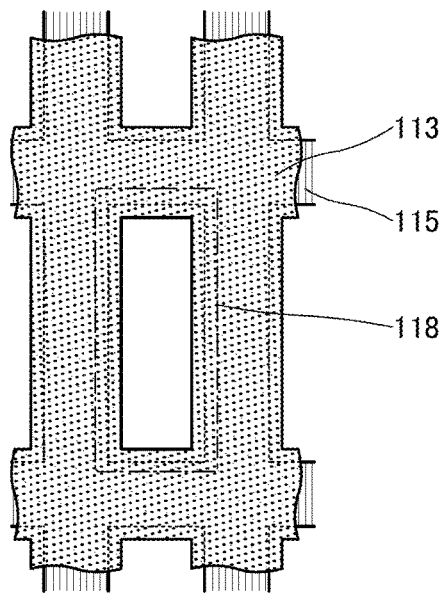

FIGS. 3A to 3C each show an example of shapes of the second conductive layer 113 and the light-blocking layer 115 in a region overlapping with the display portion 32.

As shown in FIG. 3A, a shape of the opening 118 in the second conductive layer 113 and a shape of the opening in the light-blocking layer 115 may substantially coincide with each other when seen from the top surface side. Alternatively, as shown in FIG. 3B, a shape of the opening 118 in the second conductive layer 113 may be larger than that of the opening in the light-blocking layer 115 so that the second conductive layer 113 is positioned inside the light-blocking layer 115. Thus, the influence of a relative misalignment between the second conductive layer 113 and the light-blocking layer 115 can be reduced. Further alternatively, as shown in FIG. 3C, a shape of the opening 118 can be smaller than a shape of the opening in the light-blocking layer 115 so that the second conductive layer 113 has a portion that does not overlap with the light-blocking layer 115. In such a structure, the second conductive layer 113 can have a large width, so that high conductivity can be achieved. Furthermore, the thickness of the second conductive layer 113 can be reduced. Thinning the second conductive layer 113 allows the second conductive layer 113 to be less recognized visually from the first substrate 21 side.

Note that a material that transmits visible light is preferably used for the second conductive layer 113, in which case the second conductive layer 113 is difficult to be visually recognized from the first substrate 21 side and a decrease in display quality can be suppressed.

In the case where the second conductive layer 113 is positioned so as to be hidden by the light-blocking layer 115 as shown in FIGS. 3A and 3B, light emitted from the pixel 33 is not blocked by the second conductive layer 113; therefore, as well as a conductive material having a light-transmitting property, a conductive material having a light-blocking property such as metal or alloy may be used for the second conductive layer 113. In particular, the resistance of the conductive material is preferably low in the case of a large-sized touch panel, because a wiring resistance can be reduced.

FIG. 4 shows a case where an optical adjustment layer 119 is provided between two adjacent first conductive layers 111.

The optical adjustment layer 119 allows a pattern of the first conductive layer 111 to be less recognized visually when seen from the first substrate 21 side, which increases display quality.

A material having optical properties (e.g., transmittance, refractive index, and reflectivity) close to the first conductive layer 111 can be used for the optical adjustment layer 119. For example, a material having transmittance within a range of ±5% of that of the first conductive layer 111 can be used for the optical adjustment layer 119. It is particularly preferable that the same material be used for the optical adjustment layer 119 and the first conductive layer 111. In this case, the first conductive layer 111 and the optical adjustment layer 119 are preferably formed at the same time by processing the same conductive film, in which case the layers can have the same thickness and a process can be simplified.

In the case where a conductive material is used for the optical adjustment layer 119, a structure in which the optical adjustment layer 119 can be supplied with a predetermined potential is preferable. For example, a structure in which the optical adjustment layer 119 is supplied with a fixed potential such as a common potential or a ground potential may be used. As another example, a structure in which the optical adjustment layer 119 is electrically connected to one of the first conductive layer 111 and the second conductive layer 113 may be used.

Figure 5A:
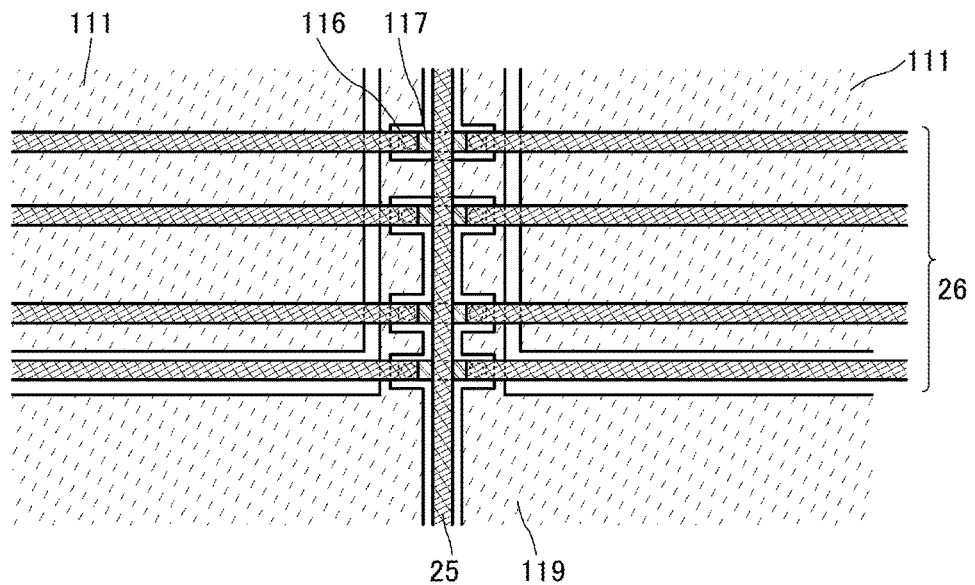
FIGS. 5A and 5B each show a structure example of a touch panel module of an embodiment.

FIG. 5A shows an example of a top surface shape of each of the wiring 25, the wirings 26, the first conductive layer 111, and the optical adjustment layer 119 when seen from the first substrate 21 side.

As shown in FIG. 5A, the wiring 25 and the wirings 26 preferably include conductive layers obtained by processing the same conductive film. In this case, the conductive layers that are closest to the first substrate 21 are preferably used, whereby a distance from the wiring 25 or the wiring 26 to the first conductive layer 111 in a thickness direction can be increased. As a result, a parasitic capacitance generated between each wiring and the first conductive layer 111 can be reduced, and detection sensitivity can be increased.

In an intersection portion of the wiring 25 and the wiring 26, a conductive layer 117 is provided on the side of the wiring 25 which is opposite to the first substrate 21, with an insulating layer provided therebetween, and openings are provided in the insulating layer; the wiring 26 intersects with the wiring 25 with the conductive layer 117 and the openings provided therebetween. In this case, it is preferable that the optical adjustment layer 119, the first conductive layer 111, and the like not be provided in a region overlapping with the conductive layer 117, because a parasitic capacitance of the wiring 26 can be reduced and detection sensitivity can be increased.

Figure 5B:
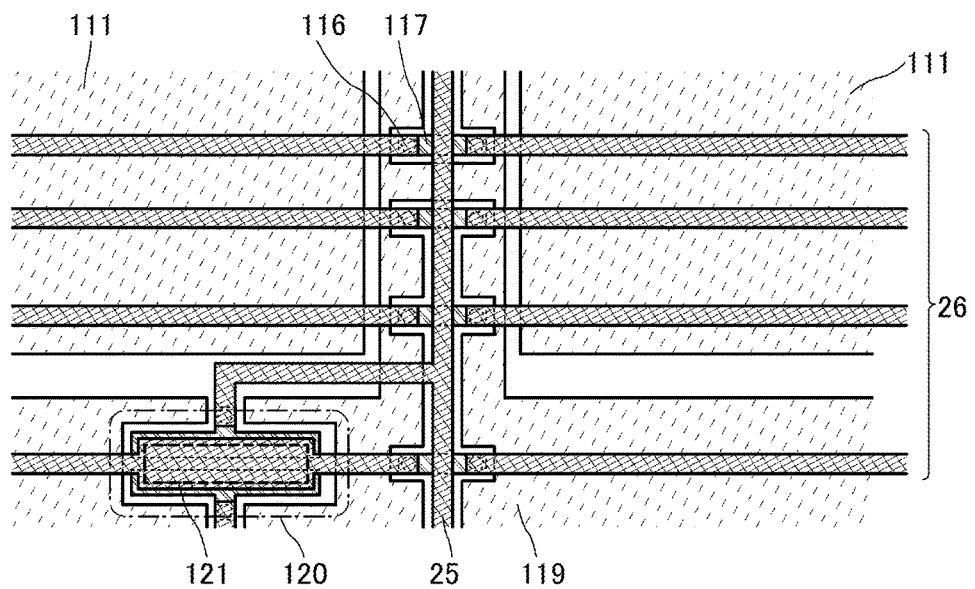

FIG. 5B shows a structure example in which a transistor 120 including a semiconductor layer 121 is provided. As shown in FIG. 5B, a light-blocking layer such as a conductive layer forming the wiring 26 or the like is preferably provided closer to the first substrate 21 side than the semiconductor layer 121 is. At this time, part of the wiring 26 can function as a gate electrode of the transistor. In the structure shown in FIG. 5B, the semiconductor layer 121 is prevented from being irradiated with external light that passes through the first substrate 21, so that a change in the electrical characteristics of the transistor can be suppressed. In particular, a portion of the transistor that overlaps with the display portion 32 is likely to be affected by external light. Therefore, a structure as shown in FIG. 5B is preferably used for a transistor provided in the portion.

Cross-Sectional Structure Example

A cross-sectional structure example of the touch panel module 10 is described below.

Cross-Sectional Structure Example 1

FIG. 6A is a cross-sectional schematic view of the touch panel module of one embodiment of the present invention. In the touch panel module shown in FIG. 6A, an active matrix touch sensor and a display element are provided between a pair of substrates, and therefore, the thickness of the touch panel module can be reduced. Note that in this specification and the like, a touch sensor in which sensor elements each include an active element is referred to as an active matrix touch sensor.

The touch panel module has a structure in which the first substrate 21 and the second substrate 31 are bonded to each other with a bonding layer 220. The capacitor 110, a transistor 251, a transistor 252, a contact portion 253, the coloring layer 114, the light-blocking layer 115, and the like are provided on the second substrate 31 side of the first substrate 21. A transistor 201, a transistor 202, a transistor 203, a light-emitting element 204, a contact portion 205, and the like are provided over the second substrate 31.

An insulating layer 212, an insulating layer 213, an insulating layer 214, an insulating layer 215, an insulating layer 216, an insulating layer 217, an insulating layer 218, a spacer 219, a conductive layer 225, and the like are provided over the second substrate 31 with a bonding layer 211 provided between the second substrate 31 and them.

The light-emitting element 204 is provided over the insulating layer 217. The light-emitting element 204 includes a first electrode 221, an EL layer 222, and a second electrode 223 (see FIG. 6B). An optical adjustment layer 224 is provided between the first electrode 221 and the EL layer 222. The insulating layer 218 is provided to cover end portions of the first electrode 221 and the optical adjustment layer 224.

In FIG. 6A, the transistor 201 for controlling current and the transistor 202 for controlling switching are provided in the pixel 33. One of a source and a drain of the transistor 201 is electrically connected to the first electrode 221 through the conductive layer 225.

In FIG. 6A, the transistor 203 is provided in the circuit 34.

In the example illustrated in FIG. 6A, the transistors 201 and 203 each have a structure in which a semiconductor layer where a channel is formed is provided between two gate electrodes. Such transistors can have a higher field-effect mobility and thus have higher on-state current than other transistors. Consequently, a circuit capable of high-speed operation can be obtained. Furthermore, the area occupied by a circuit portion can be reduced. The use of the transistor having high on-state current can reduce signal delay in wirings and can suppress display unevenness even in a display panel or a touch panel in which the number of wirings is increased because of increase in size or resolution.

Note that the transistor included in the circuit 34 and the transistor included in the pixel 33 may have the same structure. Transistors included in the circuit 34 may have the same structure or different structures. Transistors included in the pixel 33 may have the same structure or different structures. Transistors provided on the first substrate 21 side (the transistor 251, the transistor 252, and the like) may have the same structure or different structures.

In the example illustrated in FIG. 6A, a light-emitting element with a top-emission structure is used as the light-emitting element 204. The light-emitting element 204 emits light toward the second electrode 223 side. The transistors 201 and 202, a capacitor, a wiring, and the like are provided closer to the second substrate 31 side than a light-emitting region of the light-emitting element 204 is to overlap with the light-emitting region. Thus, an aperture ratio of the pixel 33 can be increased.

An insulating layer 262, an insulating layer 263, an insulating layer 264, an insulating layer 265, the first conductive layer 111, the insulating layer 112, the second conductive layer 113, an insulating layer 266, the coloring layer 114, the light-blocking layer 115, and the like are provided on the second substrate 31 side of the first substrate 21 with a bonding layer 261 provided between the second substrate 31 and them. An overcoat 267 covering the coloring layer 114 and the light-blocking layer 115 may be provided.

The first conductive layer 111 is electrically connected to one of a source and a drain of the transistor 251.

The second conductive layer 113 is provided on the second substrate 31 side of the insulating layer 112. The second conductive layer 113 has the opening 118. The second conductive layer 113 is provided to overlap with the light-blocking layer 115. The opening 118 in the second conductive layer 113 is provided to overlap with the coloring layer 114.

The light-emitting region of the light-emitting element 204 and the coloring layer 114 are provided to overlap with each other, and light emitted from the light-emitting element 204 is extracted from the first substrate 21 side through the coloring layer 114. The opening 118 in the second conductive layer 113 is provided to overlap with the coloring layer 114, whereby the light does not need to pass through the second conductive layer 113. Thus, a decrease in luminance of light extracted from the first substrate 21 side can be suppressed.

By using a flexible material for the first substrate 21 and the second substrate 31, a flexible touch panel can be achieved.

A color filter method is employed in the touch panel of one embodiment of the present invention. For example, a structure in which pixels of three colors with the color filters of red (R), green (G), and blue (B) express one color can be employed for the coloring layer 114. In addition, a pixel of white (W) or yellow (Y) may be used in the structure.

Owing to the combination of the coloring layer 114 and a microcavity structure using the optical adjustment layer 224, light with high color purity can be extracted from the touch panel of one embodiment of the present invention. The thickness of the optical adjustment layer 224 may be varied depending on the color of the pixel. Some pixels do not necessarily have the optical adjustment layer 224.

An EL layer that emits white light is preferably used as the EL layer 222 of the light-emitting element 204. By using the light-emitting element 204, it is not necessary to form the EL layers 222 expressing different colors in pixels. Therefore, the cost can be reduced, and high resolution is achieved easily. Furthermore, with the use of the optical adjustment layers 224 having different thicknesses in pixels, light with a wavelength suitable for each pixel can be extracted, which increases color purity. Note that the EL layers 222 expressing different colors may be formed in pixels, in which case the optical adjustment layer 224 and the coloring layer 114 are not necessarily used.

An opening is provided in the insulating layers and the like in a region overlapping with the contact portion 205 provided over the second substrate 31, and the contact portion 205 and the FPC 41 are electrically connected to each other with a connection layer 260 provided in the opening. Furthermore, an opening is provided in the insulating layers and the like in a region overlapping with the first substrate 21, and the contact portion 253 and the FPC 42 are electrically connected to each other through a connection layer 210 provided in the opening.

In the structure shown in FIG. 6A, the contact portion 205 has a conductive layer formed by processing a conductive film that is also used for the source electrode and the drain electrode of the transistor. Furthermore, the contact portion 253 has a stacked-layer structure of a conductive layer formed by processing a conductive film that is also used for the gate electrode of the transistor, a conductive layer formed by processing a conductive film that is also used for the source electrode and the drain electrode of the transistor, and a conductive layer formed by processing a conductive film that is also used for the second conductive layer 113. It is preferable that the contact portion have a stacked-layer structure of a plurality of conductive layers as described above because electric resistance can be reduced and mechanical strength can be increased.

As the connection layer 210 and the connection layer 260, any of various anisotropic conductive films (ACF), anisotropic conductive pastes (ACP), or the like can be used.

A material in which impurities such as water or hydrogen do not easily diffuse is preferably used for the insulating layer 212 and the insulating layer 262. That is, the insulating layer 212 and the insulating layer 262 can each function as a barrier film. Such a structure enables diffusion of the impurities to the light-emitting element 204 and the transistors to be effectively suppressed even in the case of using a material permeable to moisture for the first substrate 21 and the second substrate 31, and a highly reliable touch panel can be achieved.

[Components]

The above components are described below.

The transistor includes a conductive layer functioning as the gate electrode, the semiconductor layer, a conductive layer functioning as the source electrode, a conductive layer functioning as the drain electrode, and an insulating layer functioning as a gate insulating layer. FIG. 6A shows the case where a bottom-gate transistor is used.

Note that there is no particular limitation on the structure of the transistor included in the touch panel of one embodiment of the present invention. For example, a forward staggered transistor or an inverted staggered transistor may be used. A top-gate transistor or a bottom-gate transistor may be used. A semiconductor material used for the transistor is not particularly limited, and for example, an oxide semiconductor, silicon, or germanium can be used.

There is no particular limitation on the crystallinity of a semiconductor material used for the transistor, and an amorphous semiconductor or a semiconductor having crystallinity (a microcrystalline semiconductor, a polycrystalline semiconductor, a single-crystal semiconductor, or a semiconductor partly including crystal regions) may be used. It is preferable that a semiconductor having crystallinity be used, in which case deterioration of the transistor characteristics can be suppressed.

As a semiconductor material for the semiconductor layer of the transistor, an element of Group 4, a compound semiconductor, or an oxide semiconductor can be used, for example. Typically, a semiconductor containing silicon, a semiconductor containing gallium arsenide, an oxide semiconductor containing indium, or the like can be used.

An oxide semiconductor is preferably used as a semiconductor in which a channel of the transistor is formed. In particular, an oxide semiconductor having a wider band gap than silicon is preferably used. A semiconductor material having a wider band gap and a lower carrier density than silicon is preferably used because off-state current of the transistor can be reduced.

For example, the oxide semiconductor preferably contains at least indium (In) or zinc (Zn). The oxide semiconductor more preferably contains an In-M-Zn-based oxide (M is a metal such as Al, Ti, Ga, Ge, Y, Zr, Sn, La, Ce, or Hf).

As the semiconductor layer, it is particularly preferable to use an oxide semiconductor film including a plurality of crystal parts whose c-axes are aligned substantially perpendicular to a surface on which the semiconductor layer is formed or the top surface of the semiconductor layer and in which a grain boundary is not observed between adjacent crystal parts.

There is no grain boundary in such an oxide semiconductor; thus, generation of a crack in an oxide semiconductor film which is caused by stress when a display panel is bent is prevented. Therefore, such an oxide semiconductor can be preferably used for a flexible touch panel which is used in a bent state, or the like.

Moreover, the use of such an oxide semiconductor for the semiconductor layer makes it possible to provide a highly reliable transistor in which a change in the electrical characteristics is suppressed.

Charge accumulated in a capacitor through a transistor can be held for a long time because of the low off-state current of the transistor. When such a transistor is used for a pixel, operation of a driver circuit can be stopped while a gray scale of an image displayed in each display region is maintained. As a result, a display device with an extremely low power consumption can be obtained.

Alternatively, silicon is preferably used as a semiconductor in which a channel of a transistor is formed. Although amorphous silicon may be used as silicon, silicon having crystallinity is particularly preferable. For example, microcrystalline silicon, polycrystalline silicon, single crystal silicon, or the like is preferably used. In particular, polycrystalline silicon can be formed at a lower temperature than single crystal silicon and has higher field effect mobility and higher reliability than amorphous silicon. When such a polycrystalline semiconductor is used for a pixel, the aperture ratio of the pixel can be improved. Even in the case where pixels are provided at extremely high resolution, a gate driver circuit and a source driver circuit can be formed over a substrate over which the pixels are formed, and the number of components of an electronic device can be reduced.

As conductive layers such as a gate, a source, and a drain of the transistor and a wiring and an electrode in the touch panel, a single-layer structure or a stacked-layer structure using any of metals such as aluminum, titanium, chromium, nickel, copper, yttrium, zirconium, molybdenum, silver, tantalum, and tungsten, or an alloy containing any of these metals as its main component can be used. For example, a single-layer structure of an aluminum film containing silicon, a two-layer structure in which an aluminum film is stacked over a titanium film, a two-layer structure in which an aluminum film is stacked over a tungsten film, a two-layer structure in which a copper film is stacked over a copper-magnesium-aluminum alloy film, a two-layer structure in which a copper film is stacked over a titanium film, a two-layer structure in which a copper film is stacked over a tungsten film, a three-layer structure in which a titanium film or a titanium nitride film, an aluminum film or a copper film, and a titanium film or a titanium nitride film are stacked in this order, a three-layer structure in which a molybdenum film or a molybdenum nitride film, an aluminum film or a copper film, and a molybdenum film or a molybdenum nitride film are stacked in this order, and the like can be given. Note that a transparent conductive material containing indium oxide, tin oxide, or zinc oxide may be used. Copper containing manganese is preferably used because controllability of a shape by etching is increased.

As a light-transmitting conductive material, a conductive oxide such as indium oxide, indium tin oxide, indium zinc oxide, zinc oxide, or zinc oxide to which gallium is added, or graphene can be used. Alternatively, a metal material such as gold, silver, platinum, magnesium, nickel, tungsten, chromium, molybdenum, iron, cobalt, copper, palladium, or titanium, or an alloy material containing any of these metal materials can be used. Alternatively, a nitride of the metal material (e.g., titanium nitride) or the like may be used. In the case of using the metal material or the alloy material (or the nitride thereof), the thickness is set small enough to be able to transmit light. Alternatively, a stack of any of the above materials can be used as the conductive layer. For example, a stack of indium tin oxide and an alloy of silver and magnesium is preferably used because the conductivity can be increased.

Examples of an insulating material that can be used for the insulating layers, the overcoat 267, the spacer 219, and the like include a resin such as acrylic or epoxy resin, a resin having a siloxane bond, and an inorganic insulating material such as silicon oxide, silicon oxynitride, silicon nitride oxide, silicon nitride, or aluminum oxide.

As described above, the light-emitting element is preferably provided between a pair of insulating films with low water permeability. Thus, an impurity such as water can be prevented from entering the light-emitting element, leading to prevention of a decrease in the reliability of the light-emitting device.

As an insulating film with low water permeability, a film containing nitrogen and silicon (e.g., a silicon nitride film or a silicon nitride oxide film), a film containing nitrogen and aluminum (e.g., an aluminum nitride film), or the like can be used. Alternatively, a silicon oxide film, a silicon oxynitride film, an aluminum oxide film, or the like can be used.

For example, the water vapor transmittance of the insulating film with low water permeability is lower than or equal to $1\times10^{-5}$ [g/(m$^2$·day)], preferably lower than or equal to $1\times10^{-6}$ [g/(m$^2$·day)], further preferably lower than or equal to $1\times10^{-7}$ [g/(m$^2$·day)], still further preferably lower than or equal to $1\times10^{-8}$ [g/(m$^2$·day)].

For the bonding layers, a curable resin such as a heat curable resin, a photocurable resin, or a two-component type curable resin can be used. For example, a resin such as an acrylic resin, a urethane resin, an epoxy resin, or a resin having a siloxane bond can be used.

The EL layer 222 includes at least a light-emitting layer. In addition to the light-emitting layer, the EL layer 222 may further include one or more layers containing any of a substance with a high hole-injection property, a substance with a high hole-transport property, a hole-blocking material, a substance with a high electron-transport property, a substance with a high electron-injection property, a substance with a bipolar property (a substance with a high electron- and hole-transport property), and the like.

For the EL layer 222, either a low molecular compound or a high molecular compound can be used, and an inorganic compound may be used. Each of the layers included in the EL layer 222 can be formed by any of the following methods: an evaporation method (including a vacuum evaporation method), a transfer method, a printing method, an inkjet method, a coating method, and the like.

As examples of a material that can be used for the light-blocking layer 115, carbon black, a metal oxide, and a composite oxide containing a solid solution of a plurality of metal oxides can be given.

As examples of a material that can be used for the coloring layer 114, a metal material, a resin material, and a resin material containing a pigment or dye can be given.

Manufacturing Method Example

Here, a method for manufacturing a flexible touch panel is described.

For convenience, a structure including a pixel and a circuit, a structure including an optical member such as a color filter, or a structure including a touch sensor is referred to as an element layer. An element layer includes a display element, for example, and may include a wiring electrically connected to the display element or an element such as a transistor used in a pixel or a circuit in addition to the display element.

Here, a support body (e.g., the first substrate 21 or the second substrate 31) with an insulating surface where an element layer is formed is referred to as a base material.

As a method for forming an element layer over a flexible base material provided with an insulating surface, there are a method in which an element layer is formed directly over a base material, and a method in which an element layer is formed over a supporting base material that has stiffness and then the element layer is separated from the supporting base material and transferred to the base material.

In the case where a material of the base material can withstand heating temperature in a process for forming the element layer, it is preferable that the element layer be formed directly over the base material, in which case a manufacturing process can be simplified. At this time, the element layer is preferably formed in a state where the base material is fixed to the supporting base material, in which case transfer thereof in an apparatus and between apparatuses can be easy.

In the case of employing the method in which the element layer is formed over the supporting base material and then transferred to the base material, first, a separation layer and an insulating layer are stacked over the supporting base material, and then the element layer is formed over the insulating layer. Next, the element layer is separated from the supporting base material and then transferred to the base material. At this time, a material is selected that would causes separation at an interface between the supporting base material and the separation layer, at an interface between the separation layer and the insulating layer, or in the separation layer.

For example, it is preferable that a stacked layer of a layer including a high-melting-point metal material, such as tungsten, and a layer including an oxide of the metal material be used as the separation layer, and a stacked layer of a plurality of layers, such as a silicon nitride layer and a silicon oxynitride layer be used over the separation layer. The use of the high-melting-point metal material is preferable because the degree of freedom of the process for forming the element layer can be increased.

The separation may be performed by application of mechanical power, by etching of the separation layer, by dripping of a liquid into part of the separation interface to penetrate the entire separation interface, or the like. Alternatively, separation may be performed by heating the separation interface by utilizing a difference in thermal expansion coefficient.

The separation layer is not necessarily provided in the case where separation can occur at an interface between the supporting base material and the insulating layer. For example, glass is used as the supporting base material and an organic resin such as polyimide is used as the insulating layer, a separation trigger is formed by locally heating part of the organic resin by laser light or the like, and separation is performed at an interface between the glass and the insulating layer. Alternatively, a metal layer may be provided between the supporting base material and the insulating layer formed of an organic resin, and separation may be performed at the interface between the metal layer and the insulating layer by heating the metal layer by feeding a current to the metal layer. In that case, the insulating layer formed of an organic resin can be used as a base material.

Examples of such a base material having flexibility include polyester resins such as polyethylene terephthalate (PET) and polyethylene naphthalate (PEN), a polyacrylonitrile resin, a polyimide resin, a polymethyl methacrylate resin, a polycarbonate (PC) resin, a polyethersulfone (PES) resin, a polyamide resin, a cycloolefin resin, a polystyrene resin, a polyamide imide resin, and a polyvinyl chloride resin. In particular, it is preferable to use a material with a low thermal expansion coefficient, and for example, a polyamide imide resin, a polyimide resin, PET, or the like with a thermal expansion coefficient lower than or equal to $30 \times 10^{-6}$/K can be suitably used. A substrate in which a fibrous body is impregnated with a resin (also referred to as prepreg) or a substrate whose thermal expansion coefficient is reduced by mixing an inorganic filler with an organic resin can also be used.

In the case where a fibrous body is included in the above material, a high-strength fiber of an organic compound or an inorganic compound is used as the fibrous body. The high-strength fiber is specifically a fiber with a high tensile elastic modulus or a fiber with a high Young's modulus. Typical examples thereof include a polyvinyl alcohol based fiber, a polyester based fiber, a polyamide based fiber, a polyethylene based fiber, an aramid based fiber, a polyparaphenylene benzobisoxazole fiber, a glass fiber, and a carbon fiber. As the glass fiber, glass fiber using E glass, S glass, D glass, Q glass, or the like can be used. These fibers may be used in a state of a woven fabric or a nonwoven fabric, and a structure body in which this fibrous body is impregnated with a resin and the resin is cured may be used as the flexible substrate. The structure body including the fibrous body and the resin is preferably used as the flexible substrate, in which case the reliability against bending or breaking due to local pressure can be increased.

Alternatively, glass, metal, or the like that is thin enough to have flexibility can be used as the base material. Alternatively, a composite material where glass and a resin material are attached to each other may be used.

In the structure shown in FIG. 6A, for example, a first separation layer and the insulating layer 262 are formed in this order over a first supporting base material, and then components in a layer over the first separation layer and the insulating layer 262 are formed. Separately, a second separation layer and the insulating layer 212 are formed in this order over a second supporting base material, and then upper components are formed. Next, the first supporting base material and the second supporting base material are bonded to each other using the bonding layer 220. After that, separation at an interface between the second separation layer and the insulating layer 212 is conducted so that the second supporting base material and the second separation layer are removed, and then the second substrate 31 is bonded to the insulating layer 212 using the bonding layer 211. Further, separation at an interface between the first separation layer and the insulating layer 262 is conducted so that the first supporting base material and the first separation layer are removed, and then the first substrate 21 is bonded to the insulating layer 262 using the bonding layer 261. Note that either side may be subjected to separation and attachment first.

The above is the description of a manufacturing method of a flexible touch panel.

Cross-Sectional Structure Example 2

Figure 7:
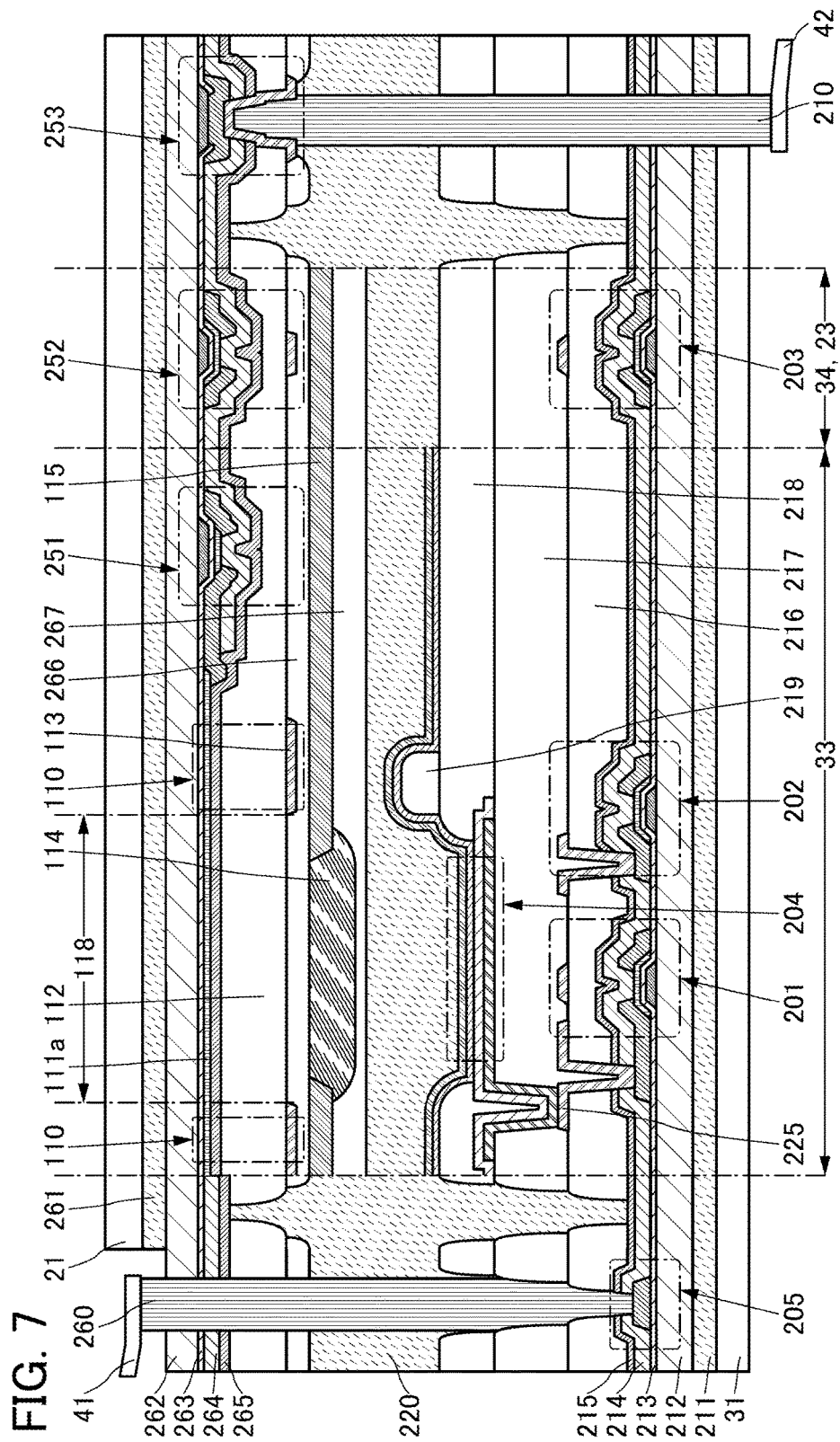
FIG. 7 shows a structure example of a touch panel module of an embodiment.

FIG. 7 is a cross-sectional structure example whose structure is partly different from that of FIGS. 6A and 6B. The structure in FIG. 7 is mainly different from that of FIGS. 6A and 6B in a structure of the first conductive layer 111.

FIG. 7 shows an example where a first conductive layer 111a including a semiconductor layer formed by processing the same film for the semiconductor layers of the transistor 251 and the transistor 252 is used instead of the first conductive layer 111 of FIGS. 6A and 6B. The first conductive layer 111a is in contact with the insulating layer 265.

Here, the first conductive layer 111a preferably includes an oxide semiconductor. An oxide semiconductor is a semiconductor material whose resistivity can be controlled by oxygen vacancies in the film of the semiconductor material and/or the concentration of impurities such as hydrogen or water in the film of the semiconductor material. Therefore, even when the semiconductor layer used for the first conductive layer 111a and the semiconductor layers used for the transistors are formed by processing the same semiconductor film, resistivity of these semiconductor layers can be controlled by increasing or decreasing oxygen vacancies and/or the concentration of impurities.

Specifically, plasma treatment is performed on an oxide semiconductor layer included in the first conductive layer 111a serving as an electrode of the capacitor 110 so that oxygen vacancies in the oxide semiconductor layer and/or impurities such as hydrogen and water in the oxide semiconductor layer is increased. Accordingly, the first conductive layer 111a can have a high carrier density and a low resistance. Alternatively, an insulating film (insulating layer 265) containing hydrogen is formed in contact with the oxide semiconductor layer to diffuse hydrogen from the insulating film containing hydrogen to the oxide semiconductor layer, so that the oxide semiconductor layer can have a high carrier density and a low resistance. Such an oxide semiconductor layer can be used for the first conductive layer 111a.

The insulating layer 264 is provided over the transistor 251 and the transistor 252 to prevent the oxide semiconductor layers thereof from being subjected to the plasma treatment. By provision of the insulating layer 264, the structure where the oxide semiconductor layers are not in contact with the insulating layer 265 containing hydrogen can be obtained. With the use of an insulating film capable of releasing oxygen as the insulating layer 264, oxygen can be supplied to the oxide semiconductor layers of the transistors. The oxide semiconductor layer to which oxygen is supplied becomes an oxide semiconductor layer in which oxygen vacancies in the film or at the interface are reduced and has a high resistance. Note that as the insulating film capable of releasing oxygen, a silicon oxide film, a silicon oxynitride film, and the like can be used, for example.

As the plasma treatment to be performed on the oxide semiconductor layer, plasma treatment using a gas containing one of a rare gas (He, Ne, Ar, Kr, or Xe), phosphorus, boron, hydrogen, and nitrogen is typical. Specifically, plasma treatment in an Ar atmosphere, plasma treatment in a mixed gas atmosphere of Ar and hydrogen, plasma treatment in an ammonia atmosphere, plasma treatment in a mixed gas atmosphere of Ar and ammonia, plasma treatment in a nitrogen atmosphere, or the like can be employed.

By the plasma treatment, an oxygen vacancy is formed in a lattice from which oxygen is released (or in a portion from which oxygen is released) in the oxide semiconductor layer. The oxygen vacancy might cause carrier generation. Further, when hydrogen is supplied from an insulating film that is in the vicinity of the oxide semiconductor layer, specifically, that is in contact with the lower surface or the upper surface of the oxide semiconductor layer, and hydrogen enters the oxygen vacancy, an electron serving as a carrier might be generated. Therefore, the oxide semiconductor layer used for the first conductive layer 111a where oxygen vacancies are increased by the plasma treatment has a higher carrier density than the oxide semiconductor layers of the transistors.

The oxide semiconductor layers of the transistors in which oxygen vacancies are reduced and the hydrogen concentration is reduced can be referred to as a highly purified intrinsic or substantially highly purified intrinsic oxide semiconductor layer. The term "substantially intrinsic" refers to the state where an oxide semiconductor has a carrier density lower than $1\times10^{17}/cm^3$, preferably lower than $1\times10^{15}/cm^3$, or further preferably lower than $1\times10^{13}/cm^3$. Furthermore, the state in which the impurity concentration is low and the density of defect states is low (the amount of oxygen vacancies is small) is referred to as "highly purified intrinsic" or "substantially highly purified intrinsic". A highly purified intrinsic or substantially highly purified intrinsic oxide semiconductor has few carrier generation sources, and thus has a low carrier density in some cases. Thus, a transistor including the oxide semiconductor film in which a channel region is formed is likely to have positive threshold voltage (normally-off characteristics). The highly purified intrinsic or substantially highly purified intrinsic oxide semiconductor layer has a low density of defect states and accordingly can have a low density of trap states.

Furthermore, the highly purified intrinsic or substantially highly purified intrinsic oxide semiconductor layer has an extremely low off-state current; even when an element has a channel width of $1\times10^6$ μm and a channel length L of 10 μm, the off-state current can be less than or equal to the measurement limit of a semiconductor parameter analyzer, i.e., less than or equal to $1\times10^{-13}$ A, at a voltage (drain voltage) between a source electrode and a drain electrode in the range from 1 V to 10 V. Thus, the transistors 251, 252, and the like each of whose channel region is formed in the oxide semiconductor layer has a small change in electrical characteristics and is highly reliable. Note that a similar oxide semiconductor layer is preferably used for the transistors 201, 202, 203, and the like that are provided on the second substrate 31 side.

In FIG. 7, a region of the insulating layer 264 overlapping with the first conductive layer 111a serving as the electrode of the capacitor 110 is selectively removed. The insulating layer 265 may be formed in contact with the first conductive layer 111a and then be removed from the upper surface of the first conductive layer 111a. For example, an insulating film containing hydrogen, that is, an insulating film capable of releasing hydrogen, typically, a silicon nitride film, is used as the insulating layer 265, whereby hydrogen can be supplied to the first conductive layer 111a. The insulating film capable of releasing hydrogen preferably has a hydrogen concentration of $1\times10^{22}$ atoms/cm$^3$ or higher. When such an insulating film is formed in contact with the first conductive layer 111a, it is possible to make the first conductive layer 111a effectively contain hydrogen. In this manner, in combination with the above-described plasma treatment, the structure of the insulating film in contact with the oxide semiconductor layer is changed, whereby the resistance of the oxide semiconductor layer can be appropriately adjusted. Note that a layer including an oxide semiconductor whose resistance is sufficiently reduced can be referred to as an oxide conductor layer.

Hydrogen contained in the first conductive layer 111a reacts with oxygen bonded to a metal atom to be water, and also causes oxygen vacancy in a lattice from which oxygen is released (or a portion from which oxygen is released). Due to entry of hydrogen into the oxygen vacancy, an electron serving as a carrier is generated in some cases. Further, in some cases, bonding of part of hydrogen to oxygen bonded to a metal element causes generation of an electron serving as a carrier. Therefore, the oxide semiconductor included in the first conductive layer 111a containing hydrogen has a higher carrier density than the oxide semiconductor used for the transistors.

Hydrogen in the oxide semiconductor layer of the transistor in which a channel region is formed is preferably reduced as much as possible. Specifically, in the oxide semiconductor layer, the concentration of hydrogen which is measured by secondary ion mass spectrometry (SIMS) is set to lower than or equal to $2\times10^{20}$ atoms/cm$^3$, preferably lower than or equal to $5\times10^{19}$ atoms/cm$^3$, more preferably lower than or equal to $1\times10^{19}$ atoms/cm$^3$, lower than $5\times10^{18}$ atoms/cm$^3$, preferably lower than or equal to $1\times10^{18}$ atoms/cm$^3$, more preferably lower than or equal to $5\times10^{17}$ atoms/cm$^3$, still more preferably lower than or equal to $1\times10^{16}$ atoms/cm$^3$.

The oxide semiconductor included in the first conductive layer 111a serving as the electrode of the capacitor 110 has the higher hydrogen concentration and/or more oxygen vacancies than the oxide semiconductor used for the transistors, and the resistance thereof is reduced.

The oxide semiconductor layer used for the first conductive layer 111a and the transistors are typically formed using a metal oxide such as an In—Ga oxide, an In—Zn oxide, or an In-M-Zn oxide (M is Mg, Al, Ti, Ga, Y, Zr, La, Ce, Nd, or Hf). Note that the oxide semiconductor layer used for the first conductive layer 111a and the transistors has light-transmitting properties.

Note that in the case where the oxide semiconductor layer used for the first conductive layer 111a and the transistors is an In-M-Zn oxide, when the summation of In and M is assumed to be 100 atomic %, the proportions of In and M are preferably set to be greater than or equal to 25 atomic % and less than 75 atomic %, respectively, or greater than or equal to 34 atomic % and less than 66 atomic %, respectively.

An energy gap of the oxide semiconductor layer used for the first conductive layer 111a and the transistors is preferably 2 eV or more, 2.5 eV or more, or 3 eV or more.

The thickness of the oxide semiconductor layer used for the first conductive layer 111a and the transistors can be greater than or equal to 3 nm and less than or equal to 200 nm, greater than or equal to 3 nm and less than or equal to 100 nm, or greater than or equal to 3 nm and less than or equal to 60 nm.

Further, in the case where the oxide semiconductor layer used for the first conductive layer 111a and the transistors is an In-M-Zn oxide, the atomic ratio of metal elements of a sputtering target used for forming the In-M-Zn oxide preferably satisfies In M and Zn M. As the atomic ratio of metal elements of such a sputtering target, In:M:Zn=1:1:1, In:M:Zn=1:1:1.2, In:M:Zn=2:1:1.5, In:M:Zn=2:1:2.3, In:M:Zn=2:1:3, In:M:Zn=3:1:2, or the like is preferable. Note that the proportion of each metal element in the atomic ratio of the formed oxide semiconductor layer used for the first conductive layer 111a and the transistors varies within a range of ±40% of that in the above atomic ratio of the sputtering target as an error.

When hydrogen is added to an oxide semiconductor in which an oxygen vacancy is generated, hydrogen enters an oxygen vacant site and forms a donor level in the vicinity of the conduction band. As a result, the conductivity of the oxide semiconductor is increased, so that the oxide semiconductor becomes a conductor. An oxide semiconductor having become a conductor can be referred to as an oxide conductor. Oxide semiconductors generally have a visible light transmitting property because of their large energy gap. An oxide conductor is an oxide semiconductor having a donor level in the vicinity of the conduction band. Therefore, the influence of absorption due to the donor level is small, and an oxide conductor has a visible light transmitting property comparable to that of an oxide semiconductor. In other words, the oxide conductor is a degenerate semiconductor and it is suggested that the conduction band edge agrees with or substantially agrees with the Fermi level. Therefore, the oxide conductor film can be used as the electrode of the capacitor, for example.

In the structure shown in FIG. 7, the first conductive layer 111a can be formed at the time of forming the transistors; thus, the manufacturing process can be simplified. In addition, the manufacturing cost can be reduced because a photomask is not necessary for forming the first conductive layer 111 in FIGS. 6A and 6B.

Cross-Sectional Structure Example 3

FIG. 8 shows a cross-sectional structure example which is partly different from the structures shown in FIGS. 6A and 6B and FIG. 7. The structure shown in FIG. 8 differs from the structure shown in FIGS. 6A and 6B mainly in that a transistor on the first substrate 21 side is not provided. That is, the cross-sectional structure shown in FIG. 8 can be used for a passive matrix touch panel.

At this time, the first conductive layer 111 can have a belt-like shape extending in one direction. Furthermore, the second conductive layer 113 can have a belt-like shape extending in a direction crossing the first conductive layer 111. A plurality of first conductive layers 111 and a plurality of second conductive layers 113 with such a structure are arranged, so that a passive matrix touch panel can be obtained.

In FIG. 8, a contact portion 271 for contact between the first conductive layer 111 and a wiring 273 and a contact portion 272 for contact between the second conductive layer 113 and a wiring 274 are shown. The first conductive layer 111 and the wiring 273 are electrically connected to each other through an opening provided in the insulating layer 264. The second conductive layer 113 and the wiring 274 are electrically connected to each other through an opening provided in the insulating layer 264 and the insulating layer 112.

The above is the description of the cross-sectional structure example.

Though this embodiment shows the structure including two substrates, i.e., the first substrate supporting the touch sensor and the second substrate supporting the display element, the structure is not limited thereto. For example, a structure with three substrates where a display element is sandwiched between two substrates and the first substrate supporting a touch sensor is bonded thereto can be employed. Alternatively, a structure with four substrates where a display element sandwiched with two substrates and a touch sensor sandwiched between two substrates are bonded to each other can be employed.

At least part of this embodiment can be implemented in combination with any of the embodiments described in this specification as appropriate.

Embodiment 2

In this embodiment, a structure example of a touch sensor of one embodiment of the present invention and a driving method thereof is described with reference to drawings.

Structure Example

FIG. 9A is a block diagram illustrating a structure of a touch panel (also referred to as an input/output device) of one embodiment of the present invention. FIG. 9B is a circuit diagram illustrating a structure of a converter CONV. FIG. 9C is a circuit diagram explaining a structure of the sensor element 22. FIG. 9D-1 and FIG. 9D-2 are timing charts illustrating a driving method of the sensor element 22.

The touch sensor illustrated in this embodiment includes a plurality of sensor elements 22 arranged in a matrix, signal lines DL electrically connected to the plurality of sensor elements 22 arranged in a row direction, and the first substrate 21 having flexibility where the sensor elements 22, scan lines G1, the signal lines DL, a driver circuit GD, and the converter CONV are provided (see FIG. 9A).

For example, the plurality of sensor elements 22 can be arranged in a matrix of n rows and m columns (n and m are each a natural number larger than or equal to 1).

Note that the sensor element 22 includes a capacitor C serving as a sensing element. The capacitor C corresponds to the capacitor 110 in Embodiment 1. For example, a first electrode and a second electrode of the capacitor C correspond to the first conductive layer 111 and the second conductive layer 113 in Embodiment 1, respectively.

The second electrode of the capacitor C is electrically connected to a wiring CS. Accordingly, a potential of the second electrode of the capacitor C can be controlled by a control signal supplied from the wiring CS.

The sensor element 22 of one embodiment of the present invention includes at least a transistor M1. In addition, a transistor M2 and/or a transistor M3 may be included (see FIG. 9C).

A gate of the transistor M1 is electrically connected to the first electrode of the capacitor C, and a first electrode of the transistor M1 is electrically connected to a wiring VPI. The wiring VPI has a function of supplying, for example, a ground potential.

A gate of the transistor M2 is electrically connected to the scan line G1, a first electrode of the transistor M2 is electrically connected to a second electrode of the transistor M1, and a second electrode of the transistor M2 is electrically connected to the signal line DL. The scan line GL has a function of supplying, for example, a selection signal. The signal line DL has a function of supplying, for example, a sensing signal DATA.

A gate of the transistor M3 is electrically connected to a wiring RES, a first electrode of the transistor M3 is electrically connected to the first electrode of the capacitor C, and a second electrode of the transistor M3 is electrically connected to a wiring VRES. The wiring RES has a function of supplying, for example, a reset signal. The wiring VRES has a function of supplying, for example, a potential at which the transistor M1 can be turned on.

Capacitance of the capacitor C is changed when an object gets closer to the first electrode or the second electrode or when a gap between the first electrode and the second electrode is changed, for example. Thus, the sensor element 22 can supply the sensing signal DATA in accordance with a change in capacitance of the capacitor C.

The wiring CS electrically connected to the second electrode of the capacitor C has a function of supplying a control signal controlling a potential of the second electrode of the capacitor C.

Note that a node at which the first electrode of the capacitor C, the gate of the transistor M1, and the first electrode of the transistor M3 are electrically connected to each other is referred to as a node A.

FIG. 10A is an example of a circuit diagram in the case where four sensor elements 22 are arranged two by two.

FIG. 10B shows a positional relationship between the first conductive layer 111 (corresponding to the first electrode) included in the sensor element 22 and the wirings. The first conductive layer 111 is electrically connected to the gate of the transistor M1 and the second electrode of the transistor M3. The first conductive layer 111 overlaps with a plurality of pixels 33 shown in FIG. 10C. The transistors M1 to M3 are preferably arranged not to overlap with the first conductive layer 111 as shown in FIG. 10B.

Figure 11A:
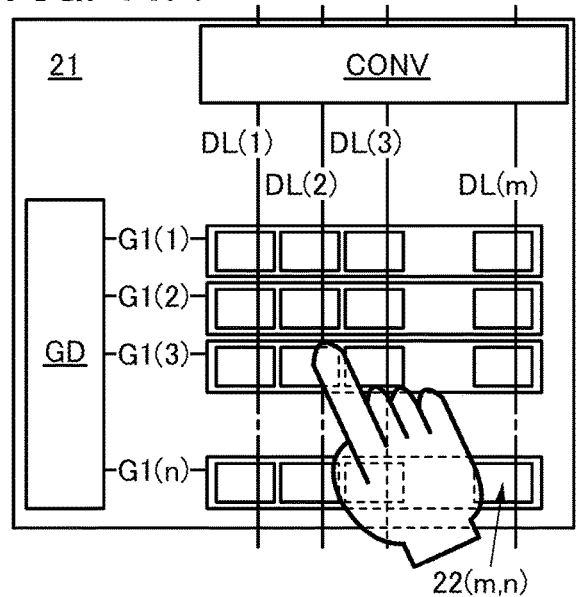
FIGS. 11A to 11C are a block diagram and circuit diagrams of a structure included in a touch panel of an embodiment.
Figure 11B:
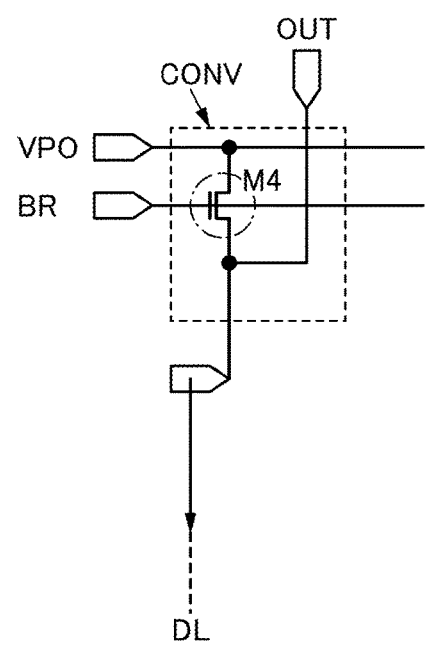
Figure 11C:
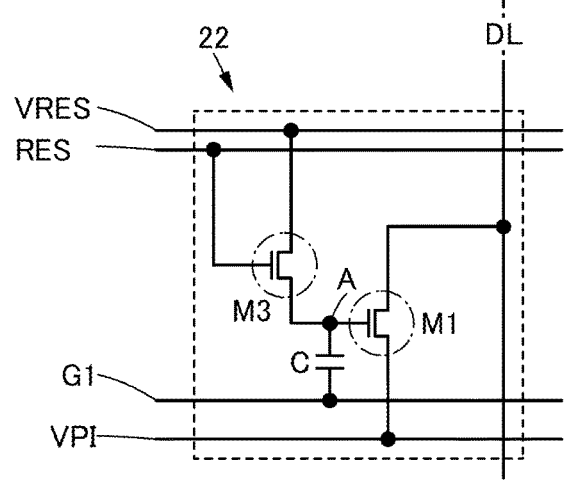

As shown in FIGS. 11A to 11C, the sensor element 22 is not necessarily provided with the transistor M2. In that case, in a plurality of sensor elements 22 arranged in the row direction, the second electrode of each capacitor C may be electrically connected the scan line G1 instead of the wiring CS.

A wiring VPO and a wiring BR shown in FIG. 9B have a function of supplying, for example, a power source potential high enough to turn on a transistor. The signal line DL has a function of supplying a sensing signal DATA. A terminal OUT has a function of supplying a signal converted based on the sensing signal DATA.

The converter CONV has a conversion circuit. Any of various circuits that can convert the sensing signal DATA and supply the converted signal to the terminal OUT can be used as the converter CONV. For example, a circuit serving as a source follower circuit or a current mirror circuit, which is formed by electrically connecting the converter CONV to the sensor element 22, can be used.

Specifically, a source follower circuit can be formed using the converter CONV including a transistor M4 (see FIG. 9B). Note that a transistor that can be formed in the same process as those of the transistors M1 to M3 may be used as the transistor M4.

For example, the structure of the transistor 251, 252, or the like illustrated in Embodiment 1 may be used for the transistors M1 to M4.

Figure 12A:
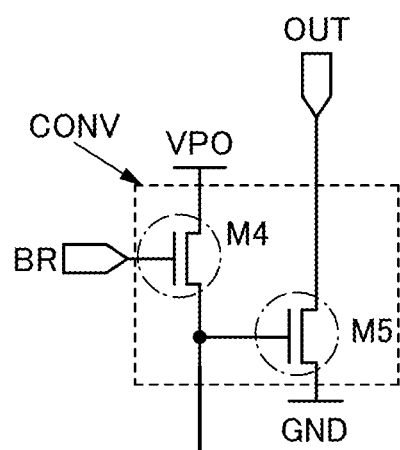
FIGS. 12A to 12C are each a circuit diagram of a structure included in a touch panel of an embodiment.
Figure 12B:
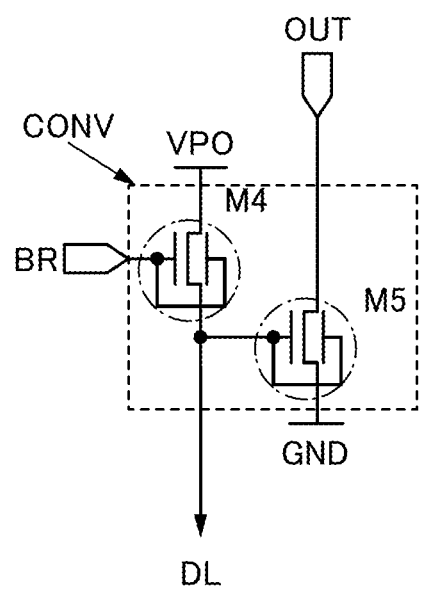
Figure 12C:
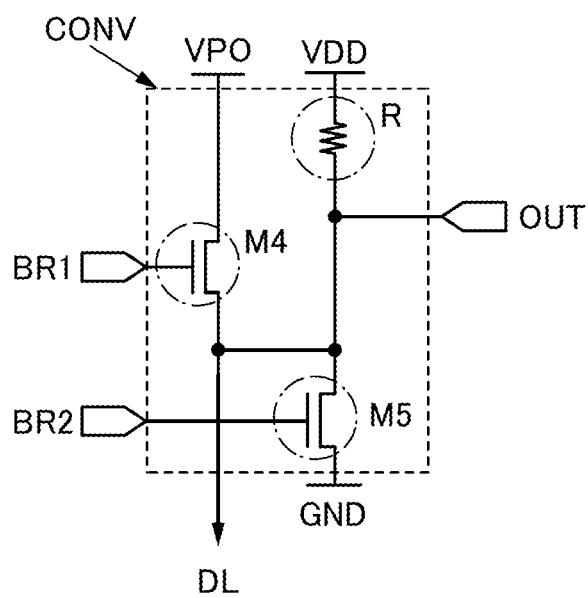

Note that the structure of the converter CONV is not limited to that shown in FIG. 9B. FIGS. 12A to 12C illustrate different examples of the converter CONV.

The converter CONV in FIG. 12A includes a transistor M5 in addition to the transistor M4. Specifically, a gate of the transistor M5 is electrically connected to the signal line DL, a first electrode of the transistor M5 is electrically connected the terminal OUT, and a second electrode of the transistor M5 is electrically connected to a wiring GND. The wiring GND has a function of supplying, for example, a ground potential. As shown in FIG. 12B, the transistors M4 and M5 may each include a second gate. In that case, the second gate is preferably electrically connected to the gate.

The converter CONV in FIG. 12C includes the transistor M4, the transistor M5m and a resistor R. Specifically, the gate of the transistor M4 is electrically connected to a wiring BR1. The gate of the transistor M5 is electrically connected to a wiring BR2, the first electrode of the transistor M5 is electrically connected the terminal OUT and a second electrode of the resistor R, and the second electrode of the transistor M5 is electrically connected the wiring GND. A first electrode of the resistor R is electrically connected a wiring VDD. The wirings BR1 and BR2 each have a function of supplying, for example, a power source potential high enough to turn on a transistor. The wiring VDD has a function of supplying a high power source potential, for example.

Figure 13A:
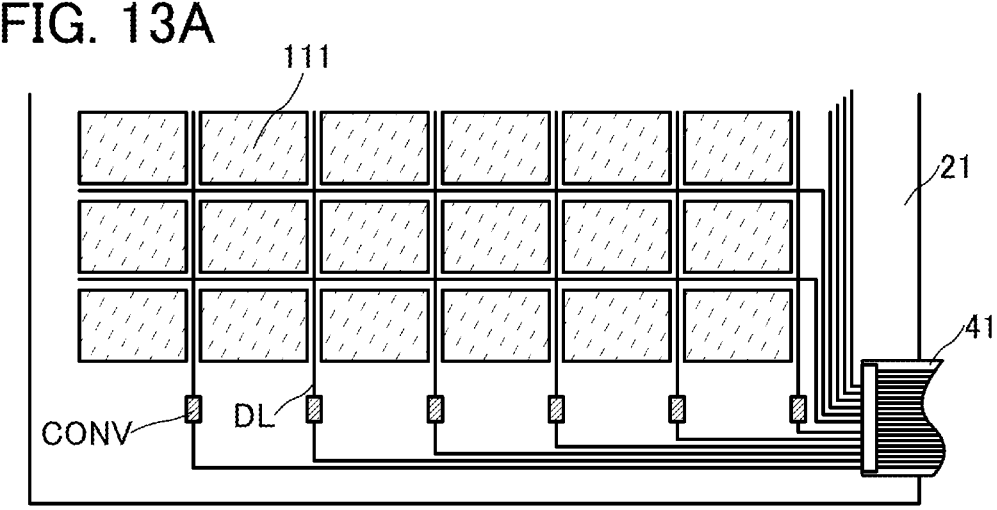
FIGS. 13A and 13B are each a structure example of a touch panel of an embodiment.
Figure 13B:
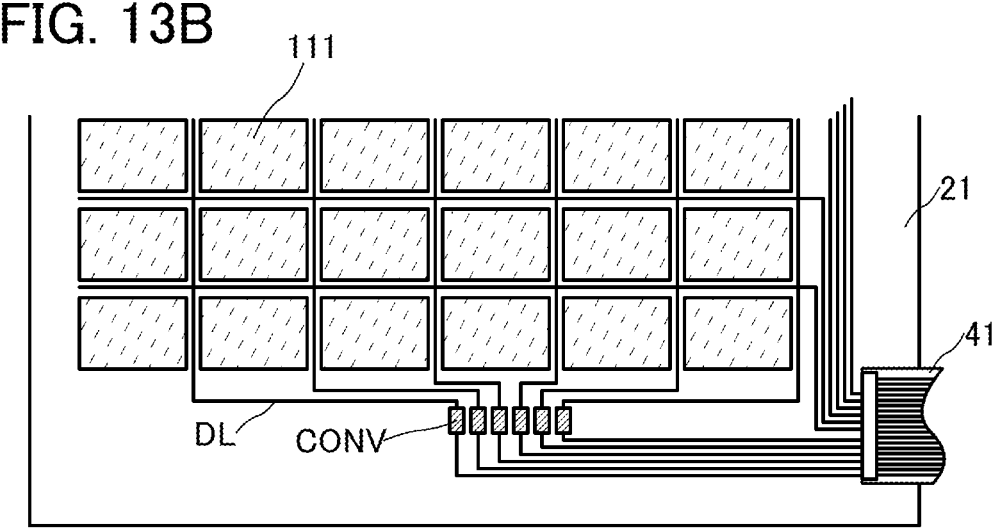

FIGS. 13A and 13B are each a schematic view showing an example of the positional relationship among the first electrodes, the signal lines DL, and the converters CONV over the first substrate 21.

When each converter CONV is provided at an end portion of the linearly extended signal line DL as shown in FIG. 13A, the length of the signal lines DL electrically connected to the converters CONV can be substantially equal to each other. The converters CONV are preferably arranged in this manner in the case where the electrical resistance of the signal line DL considerably affect the detection sensitivity.

In FIG. 13B, the lengths and the shapes of the signal lines DL are made different from each other, so that the plurality of converters CONV is arranged densely. Thus, in the case where the electrical characteristics of the transistors included in the converters CONV largely depends on their positions, the transistors are arranged densely, so that the variation in the electrical characteristics of the converters CONV is reduced and detection sensitivity can be increased.

Driving Method Example

Next, the driving method of the sensor element 22 is explained with reference to FIGS. 9A, 9B, 9C, 9D-1, and 9D-2.

[First Step]

In a first step, a reset signal for turning on the transistor M3 and subsequently turning off the transistor M3 is supplied to the gate of the transistor M3, and a potential of the first electrode of the capacitor C (that is, a potential of the node A) is set at a predetermined potential (see a period T1 in FIG. 9D-1).

Specifically, a reset signal is supplied to the wiring RES. The transistor M3 to which the reset signal is supplied sets the potential of the node A to a potential at which the transistor M1 is turned on, for example.

[Second Step]

In a second step, a selection signal that turns on the transistor M2 is supplied to the gate of the transistor M2, and the second electrode of the transistor M1 is electrically connected to the signal line DL (see a period T2 in FIG. 9D-1).

Specifically, a selection signal is supplied to the scan line G1. Through the transistor M2 to which the selection signal is supplied, the second electrode of the transistor M1 is electrically connected to the signal line DL.

[Third Step]

In a third step, a control signal is supplied to the second electrode of the capacitor C, and a potential that varies depending on the control signal and the capacitance of the capacitor C is supplied to the gate of the transistor M1.

Specifically, a rectangular control signal is supplied to the wiring CS. By supplying the rectangular control signal to the second electrode of the capacitor C, the potential of the node A is changed based on the capacitance of the capacitor C (see the latter half in the period T2 in FIG. 9D-1).

For example, when the capacitor C is placed in the air and an object with a higher dielectric constant than the air comes close to the second electrode of the capacitor C, the apparent capacitance of the capacitor C increases.

Thus, the change in the potential of the node A due to the rectangular control signal becomes smaller than that in the case where an object whose dielectric constant is higher than that of the air is not located closer (see a solid line in FIG. 9D-2).

In addition, when a gap between the first electrode and the second electrode of the capacitor C is changed by deformation of the touch panel, the capacitance of the capacitor C is changed. Accordingly, the potential of the node A is changed.

[Fourth Step]

In a fourth step, a signal obtained by the change in the potential of the gate of the transistor M1 is supplied to the signal line DL.

For example, a change in current due to the change in the potential of the gate of the transistor M1 is supplied to the signal line DL.

The converter CONV converts a change in current flowing through the signal line DL into a voltage change and supplies the voltage change, for example.

[Fifth Step]

In a fifth step, a selection signal for turning off the transistor M2 is supplied to the gate of the transistor M2.

In this manner, operation of the plurality of sensor elements 22 electrically connected to one scan line G1 is completed.

When there are n scan lines G1, the first step to the fifth step are conducted with respect to each of the scan line G1(1) to the scan line G1(n).

Figure 14A:
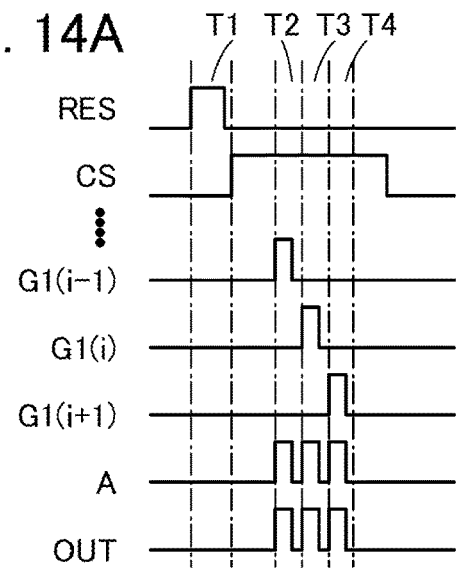
FIGS. 14A to 14C each illustrate a driving method of a touch panel of an embodiment.

Alternatively, a driving method shown in FIG. 14A may be performed when the wiring RES and the wiring CS are shared by the sensor elements 22. First, the reset signal is supplied to the wiring RES. Next, with the wiring CS supplied with the control signal, the selection signal is sequentially supplied to the scan line G1(1) to the scan line G1(n) so that a signal caused by a potential change of the node A is supplied to the signal line DL(1) to the signal line DL(m).

With such a method, frequency of supply of reset signals and that of control signals can be reduced.

In some cases, the potential of the node A is changed over time by various causes. For example, the potential of the node A is changed with a change in environment such as temperature and humidity.

In view of this, two kinds of potentials are used as a rectangular control signal to be supplied to the second electrode of the capacitor C, and a difference between two sensing signals DATA is obtained, so that an influence of a change in the potential of the node A over time can be canceled. By such an operation, detection sensitivity can be increased.

Figure 14B:
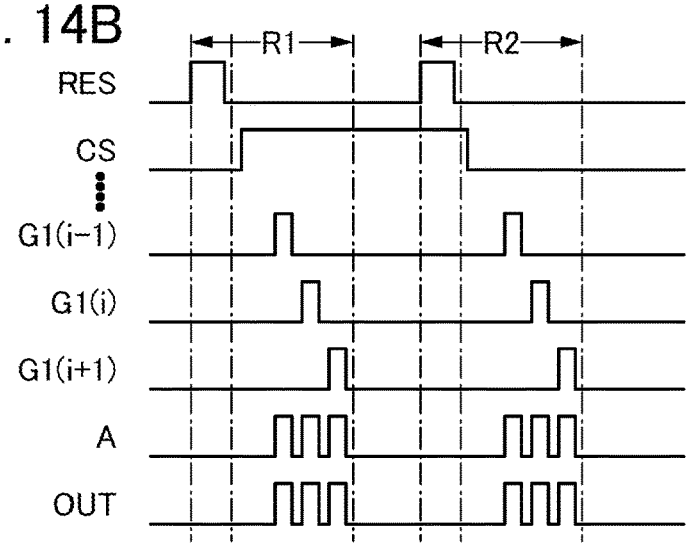

FIG. 14B shows an example of a driving method in which a period R1 and a period R2 are repeated alternately.

In the period R1 shown in FIG. 14B, a low-level potential is supplied to the wiring CS in a period in which a potential that turns on the transistor M3 is supplied to the signal line RES, and then, a high-level potential is supplied to the wiring CS. That is, in the period R1, the sensing signal DATA based on a change in the potential of the node A is supplied to the signal line DL in a state where the potential of the second electrode of the capacitor C is changed from the low-level potential to the high-level potential. Depending on the sensing signal DATA, a signal converted by the converter CONV is supplied to the terminal OUT.

In the period R2, a high-level potential is supplied to the wiring CS in a period in which a potential that turns on the transistor M3 is supplied to the signal line RES, and then, a low-level potential is supplied to the wiring CS. That is, in the period R2, the sensing signal DATA based on a change in the potential of the node A is supplied to the signal line DL in a state where the potential of the second electrode of the capacitor C is changed from the high-level potential to the low-level potential. Depending on the sensing signal DATA, a signal converted by the converter CONV is supplied to the terminal OUT.

After that, a difference between the signal supplied to the terminal OUT in the period R1 and the signal supplied to the terminal OUT in the period R2 is obtained, whereby a signal from which the influence of the change in the potential of the node A over time is canceled can be obtained.

Figure 14C:
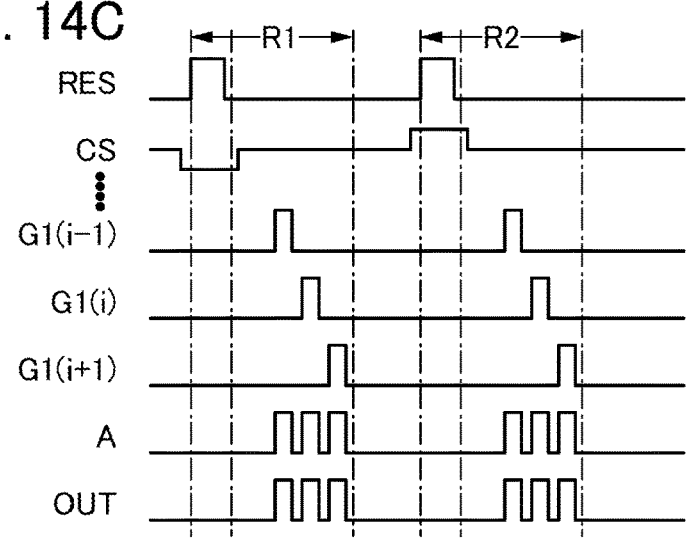

FIG. 14C shows an example of the case where the signal supplied to the wiring CS is different from the signal supplied to the wiring CS in FIG. 14B.

In FIG. 14C, the control signal supplied to the wiring CS has three kinds of potentials: a high-level potential, a middle-level potential, and a low-level potential. Specifically, in the period R1, a low-level potential is supplied to the wiring CS in a period in which a potential that turns on the transistor M3 is supplied to the signal line RES, and then, the selection signal is sequentially supplied to the scan lines G1(1) to G1(n) while a middle-level potential is supplied to the wiring CS. In the period R2, a high-level potential is supplied to the wiring CS in a period in which a potential that turns on the transistor M3 is supplied to the signal line RES, and then, the selection signal is sequentially supplied to the scan lines G1(1) to G1(n) while a middle-level potential is supplied to the wiring CS.

After that, in a manner similar to that described above, a difference between the signal supplied to the terminal OUT in the period R1 and the signal supplied to the terminal OUT in the period R2 is obtained, whereby a signal from which the influence of the change in the potential of the node A over time is canceled can be obtained.

The above is the description of the driving method.

At least part of this embodiment can be implemented in combination with any of the embodiments described in this specification as appropriate.

Embodiment 3

In this embodiment, electronic devices and lighting devices that can be fabricated according to one embodiment of the present invention will be described with reference to FIGS. 15A to 15G and FIGS. 16A to 16I.

The touch panel of one embodiment of the present invention has flexibility. Therefore, a touch panel of one embodiment of the present invention can be used in electronic devices and lighting devices having flexibility. Furthermore, according to one embodiment of the present invention, electronic devices and lighting devices having high reliability and resistance against repeated bending can be manufactured.

Examples of electronic devices include a television set (also referred to as a television or a television receiver), a monitor of a computer or the like, a digital camera, a digital video camera, a digital photo frame, a mobile phone (also referred to as a mobile phone device), a portable game machine, a portable information terminal, an audio reproducing device, a large game machine such as a pinball machine, and the like.

The touch panel of one embodiment of the present invention has flexibility and therefore can be incorporated along a curved inside/outside wall surface of a house or a building or a curved interior/exterior surface of a car.

An electronic device of one embodiment of the present invention may include a touch panel and a secondary battery. It is preferable that the secondary battery is capable of being charged by contactless power transmission.

As examples of the secondary battery, a lithium ion secondary battery such as a lithium polymer battery (lithium ion polymer battery) using a gel electrolyte, a lithium ion battery, a nickel-hydride battery, a nickel-cadmium battery, an organic radical battery, a lead-acid battery, an air secondary battery, a nickel-zinc battery, and a silver-zinc battery can be given.

The electronic device of one embodiment of the present invention may include a touch panel and an antenna. When a signal is received by the antenna, the electronic device can display an image, data, or the like on a display portion. When the electronic device includes a secondary battery, the antenna may be used for contactless power transmission.

Figure 15A:
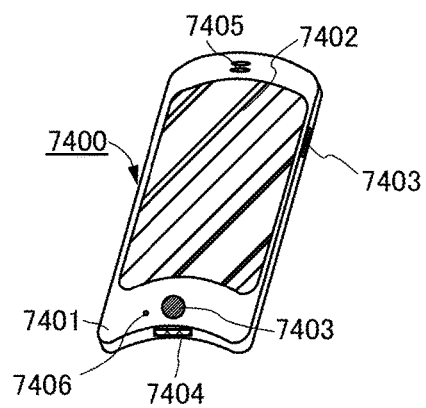
FIGS. 15A to 15G each illustrate an electronic device of an embodiment.

FIG. 15A illustrates an example of a mobile phone. The mobile phone 7400 is provided with a display portion 7402 incorporated in a housing 7401, operation buttons 7403, an external connection port 7404, a speaker 7405, a microphone 7406, and the like. Note that the mobile phone 7400 is manufactured by using the touch panel of one embodiment of the present invention for the display portion 7402. In accordance with one embodiment of the present invention, a highly reliable mobile phone having a curved display portion can be provided at a high yield.

When the display portion 7402 of the mobile phone 7400 illustrated in FIG. 15A is touched with a finger or the like, data can be input into the mobile phone 7400. Further, operations such as making a call and inputting a letter can be performed by touch on the display portion 7402 with a finger or the like.

With the operation buttons 7403, power ON or OFF can be switched. In addition, types of images displayed on the display portion 7402 can be switched; switching images from a mail creation screen to a main menu screen.

Figure 15B:
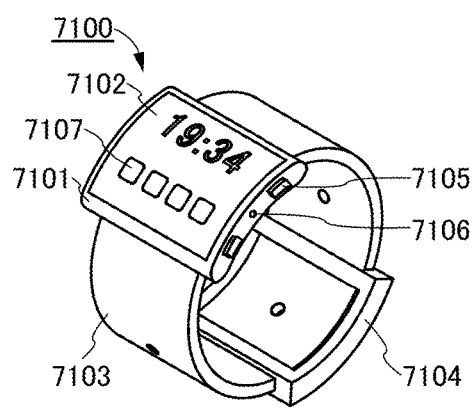

FIG. 15B illustrates an example of a wrist-watch-type portable information terminal A portable information terminal 7100 includes a housing 7101, a display portion 7102, a band 7103, a buckle 7104, an operation button 7105, an input/output terminal 7106, and the like.

The portable information terminal 7100 is capable of executing a variety of applications such as mobile phone calls, e-mailing, reading and editing texts, music reproduction, Internet communication, and a computer game.

The display surface of the display portion 7102 is bent, and images can be displayed on the bent display surface. Furthermore, the display portion 7102 includes a touch sensor, and operation can be performed by touching the screen with a finger, a stylus, or the like. For example, by touching an icon 7107 displayed on the display portion 7102, an application can be started.

With the operation button 7105, a variety of functions such as time setting, power ON/OFF, ON/OFF of wireless communication, setting and cancellation of manner mode, and setting and cancellation of power saving mode can be performed. For example, the functions of the operation button 7105 can be set freely by setting the operating system incorporated in the portable information terminal 7100.

The portable information terminal 7100 can employ near field communication that is a communication method based on an existing communication standard. In that case, for example, mutual communication between the portable information terminal 7100 and a headset capable of wireless communication can be performed, and thus hands-free calling is possible.

Moreover, the portable information terminal 7100 includes the input/output terminal 7106, and data can be directly transmitted to and received from another information terminal via a connector. Charging through the input/output terminal 7106 is possible. Note that the charging operation may be performed by wireless power feeding without using the input/output terminal 7106.

The display portion 7102 of the portable information terminal 7100 includes the touch panel of one embodiment of the present invention. According to one embodiment of the present invention, a highly reliable portable information terminal having a curved display portion can be provided with a high yield.

Figure 15C:
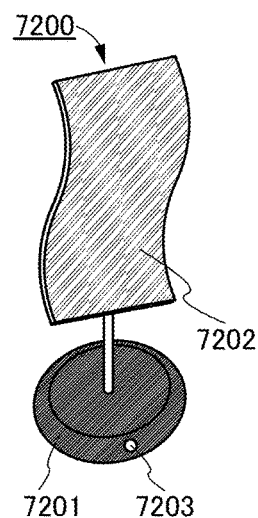
Figure 15D:
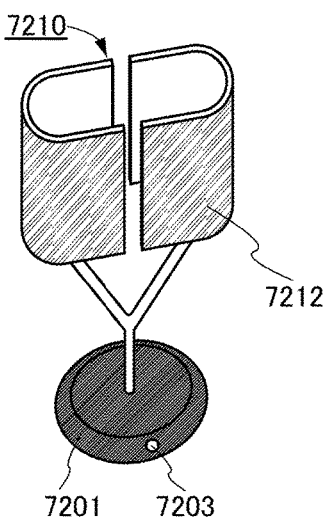
Figure 15E:
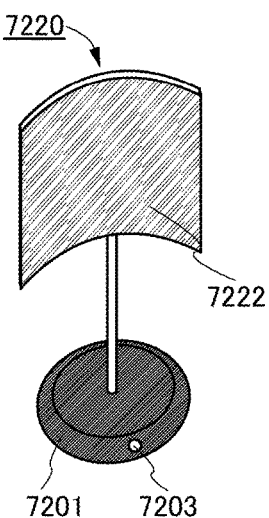

FIGS. 15C to 15E illustrate examples of a lighting device. Lighting devices 7200, 7210, and 7220 each include a stage 7201 provided with an operation switch 7203 and a light-emitting portion supported by the stage 7201.

The lighting device 7200 illustrated in FIG. 15C includes a light-emitting portion 7202 having a wave-shaped light-emitting surface, and thus has good design.

A light-emitting portion 7212 included in the lighting device 7210 illustrated in FIG. 15D has two convex-curved light-emitting portions symmetrically placed. Thus, all directions can be illuminated with the lighting device 7210 as a center.

The lighting device 7220 illustrated in FIG. 15E includes a concave-curved light-emitting portion 7222. This is suitable for illuminating a specific range because light emitted from the concave-curved light-emitting portion 7222 is collected to the front of the lighting device 7220.

The light-emitting portion included in each of the lighting devices 7200, 7210, and 7220 are flexible; thus, the light-emitting portion may be fixed on a plastic member, a movable frame, or the like so that an emission surface of the light-emitting portion can be bent freely depending on the intended use.

Note that although the lighting device in which the light-emitting portion is supported by the stage is described as an example here, a housing provided with a light-emitting portion can be fixed on a ceiling or suspended from a ceiling. Since the light-emitting surface can be curved, the light-emitting surface is curved to have a depressed shape, whereby a particular region can be brightly illuminated, or the light-emitting surface is curved to have a projecting shape, whereby a whole room can be brightly illuminated.

Here, the light-emitting portions each include the touch panel of one embodiment of the present invention. In accordance with one embodiment of the present invention, a highly reliable lighting device having a curved light-emitting portion can be provided at a high yield.

Figure 15F:
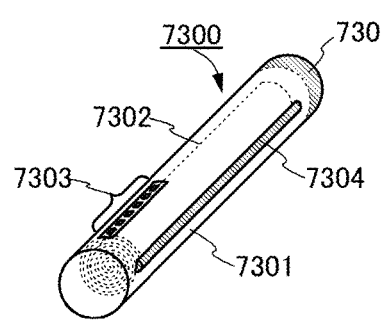

FIG. 15F illustrates an example of a portable touch panel. A touch panel 7300 includes a housing 7301, a display portion 7302, operation buttons 7303, a display portion pull 7304, and a control portion 7305.

The touch panel 7300 includes a rolled flexible display portion 7302 in the cylindrical housing 7301.

The touch panel 7300 can receive a video signal with the control portion 7305 and can display the received video on the display portion 7302. In addition, a battery is included in the control portion 7305. Moreover, a terminal portion for connecting a connector may be included in the control portion 7305 so that a video signal or power can be directly supplied from the outside with a wiring.

By pressing the operation buttons 7303, power ON/OFF, switching of displayed videos, and the like can be performed.

Figure 15G:
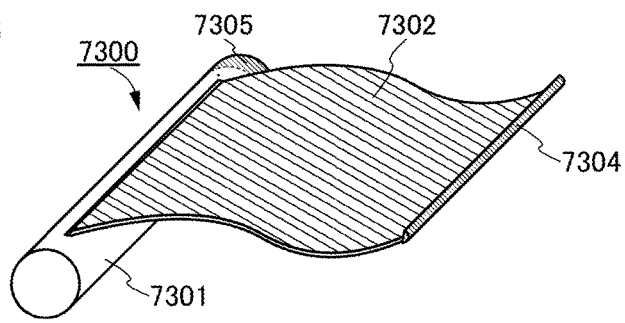

FIG. 15G illustrates a touch panel 7300 in a state where the display portion 7302 is pulled out with the display portion pull 7304. Videos can be displayed on the display portion 7302 in this state. Further, the operation buttons 7303 on the surface of the housing 7301 allow one-handed operation. The operation buttons 7303 are provided not in the center of the housing 7301 but on one side of the housing 7301 as illustrated in FIG. 15F, which makes one-handed operation easy.

Note that a reinforcement frame may be provided for a side portion of the display portion 7302 so that the display portion 7302 has a flat display surface when pulled out.

Note that in addition to this structure, a speaker may be provided for the housing so that sound is output with an audio signal received together with a video signal.

The display portion 7302 includes the touch panel of one embodiment of the present invention. According to one embodiment of the present invention, a lightweight and highly reliable touch panel can be provided with a high yield.

Figure 16A:
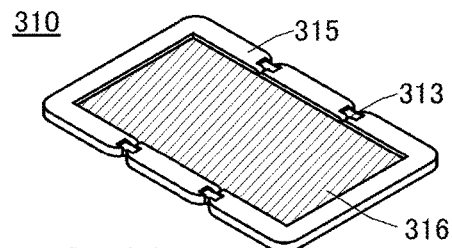
FIGS. 16A to 16I each illustrate an electronic device of an embodiment.
Figure 16B:
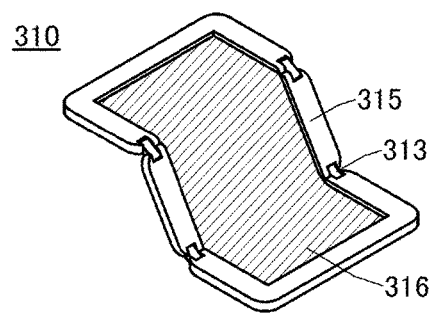
Figure 16C:
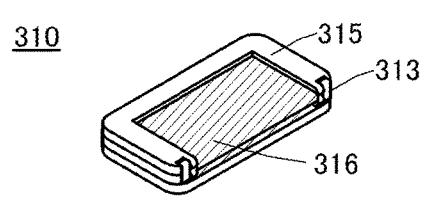

FIGS. 16A to 16C illustrate a foldable portable information terminal 310. FIG. 16A illustrates the portable information terminal 310 that is opened. FIG. 16B illustrates the portable information terminal 310 that is being opened or being folded. FIG. 16C illustrates the portable information terminal 310 that is folded. The portable information terminal 310 is highly portable when folded. When the portable information terminal 310 is opened, a seamless large display region is highly browsable.

A display panel 316 is supported by three housings 315 joined together by hinges 313. By folding the portable information terminal 310 at a connection portion between two housings 315 with the hinges 313, the portable information terminal 310 can be reversibly changed in shape from an opened state to a folded state. The touch panel according to one embodiment of the present invention can be used for the display panel 316. For example, a touch panel that can be bent with a radius of curvature of greater than or equal to 1 mm and less than or equal to 150 mm can be used.

Note that in one embodiment of the present invention, a sensor that senses whether the touch panel is in a folded state or an unfolded state and supplies sensing data may be used. The operation of a folded portion (or a portion that becomes invisible by a user by folding) of the touch panel may be stopped by a control device through the acquisition of data indicating the folded state of the touch panel. Specifically, display of the portion may be stopped, and furthermore, sensing by the touch sensor may be stopped.

Similarly, the control device of the touch panel may acquire data indicating the unfolded state of the touch panel to resume displaying and sensing by the touch sensor.

Figure 16D:
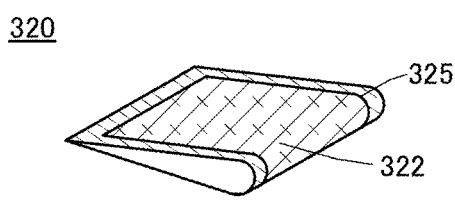
Figure 16E:
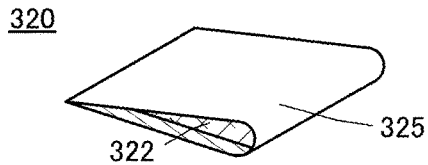

FIGS. 16D and 16E each illustrate a foldable portable information terminal 320. FIG. 16D illustrates the portable information terminal 320 that is folded so that a display portion 322 is on the outside. FIG. 16E illustrates the portable information terminal 320 that is folded so that the display portion 322 is on the inside. When the portable information terminal 320 is not used, the portable information terminal 320 is folded so that a non-display portion 325 faces the outside, whereby the display portion 322 can be prevented from being contaminated or damaged. The touch panel in one embodiment of the present invention can be used for the display portion 322.

Figure 16F:
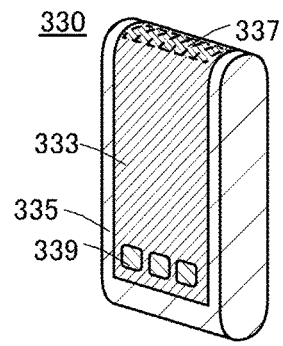
Figure 16G:
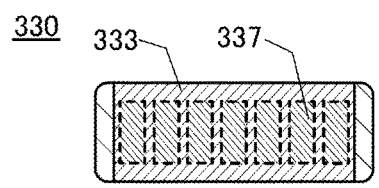
Figure 16H:
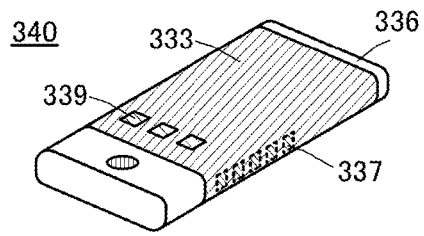

FIG. 16F is a perspective view illustrating an external shape of the portable information terminal 330. FIG. 16G is a top view of the portable information terminal 330. FIG. 16H is a perspective view illustrating an external shape of a portable information terminal 340.

The portable information terminals 330 and 340 each function as, for example, one or more of a telephone set, a notebook, and an information browsing system. Specifically, the portable information terminals 330 and 340 each can be used as a smartphone.

The portable information terminals 330 and 340 can display characters and image information on its plurality of surfaces. For example, three operation buttons 339 can be displayed on one surface (FIGS. 16F and 16H). In addition, information 337 indicated by dashed rectangles can be displayed on another surface (FIGS. 16G and 16H). Examples of the information 337 include notification from a social networking service (SNS), display indicating reception of an e-mail or an incoming call, the title of an e-mail or the like, the sender of an e-mail or the like, the date, the time, remaining battery, and the reception strength of an antenna. Alternatively, the operation buttons 339, an icon, or the like may be displayed in place of the information 337. Although FIGS. 16F and 16G illustrate an example in which the information 337 is displayed at the top, one embodiment of the present invention is not limited thereto. The information may be displayed, for example, on the side as in the portable information terminal 340 illustrated in FIG. 16H.

For example, a user of the portable information terminal 330 can see the display (here, the information 337) with the portable information terminal 330 put in a breast pocket of his/her clothes.

Specifically, a caller's phone number, name, or the like of an incoming call is displayed in a position that can be seen from above the portable information terminal 330. Thus, the user can see the display without taking out the portable information terminal 330 from the pocket and decide whether to answer the call.

A touch panel of one embodiment of the present invention can be used for a display portion 333 mounted in each of a housing 335 of the portable information terminal 330 and a housing 336 of the portable information terminal 340. According to one embodiment of the present invention, a highly reliable touch panel having a curved display portion can be provided with a high yield.

Figure 16I:
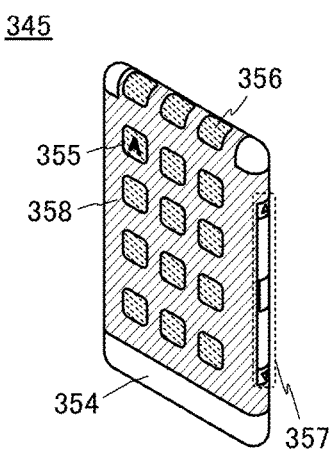

As in a portable information terminal 345 illustrated in FIG. 16I, data may be displayed on three or more surfaces. Here, data 355, data 356, and data 357 are displayed on different surfaces.

The touch panel of one embodiment of the present invention can be used for a display portion 358 included in a housing 354 of the portable information terminal 345. According to one embodiment of the present invention, a highly reliable touch panel having a curved display portion can be provided with a high yield.

This application is based on Japanese Patent Application serial no. 2014-095046 filed with Japan Patent Office on May 2, 2014, the entire contents of which are hereby incorporated by reference.

What is claimed is:

1. A touch sensor comprising:
a first substrate;
a first conductive layer;
a second conductive layer; and
an insulating layer,
wherein the first conductive layer is between the first substrate and the second conductive layer,
wherein the insulating layer is between the first conductive layer and the second conductive layer,
wherein the first conductive layer, the second conductive layer, and the insulating layer form a capacitor,
wherein the first conductive layer is on a touch surface side of the touch sensor,
wherein the second conductive layer has an opening, and
wherein the opening in the second conductive layer and the first conductive layer overlap with each other in a region.

2. The touch sensor according to claim 1, further comprising a first transistor electrically connected to the first conductive layer.

3. A touch sensor module comprising:
the touch sensor according to claim 1; and
a first flexible printed circuit,
wherein the first flexible printed circuit is configured to supply a signal to at least one of the first conductive layer and the second conductive layer.

4. An electronic device comprising:
the touch sensor module according to claim 3; and
a housing,
wherein the touch sensor module is incorporated in the housing.

5. A touch panel comprising:
the touch sensor according to claim 1;
a second substrate;
a display element;
a first layer; and
a second layer,
wherein the second substrate has a region overlapping with the first substrate,
wherein the display element, the first layer, and the second layer are between the first substrate and the second substrate,
wherein the second conductive layer is between the display element and the first conductive layer,
wherein the first layer is configured to transmit light in a specific wavelength range and has a region overlapping with the display element,
wherein the second layer is configured to block visible light,
wherein the first conductive layer has a region overlapping with the first layer and a region overlapping with the second layer,
wherein the second conductive layer has a region overlapping with the second layer,
wherein a region where the opening in the second conductive layer and the display element overlap with each other is included, and
wherein the opening in the second conductive layer and the first layer overlap with each other in a region.

6. The touch panel according to claim 5, wherein the display element is a light-emitting element.

7. The touch panel according to claim 5, wherein the first substrate and the second substrate each have flexibility.

8. A touch panel module comprising:
the touch panel according to claim 5;
a first flexible printed circuit; and
a second flexible printed circuit,
wherein the first flexible printed circuit is configured to supply a signal to at least one of the first conductive layer and the second conductive layer, and
wherein the second flexible printed circuit is configured to supply a signal to the display element.

9. An electronic device comprising:
the touch panel module according to claim 8; and
a housing,
wherein the touch panel module is incorporated in the housing.

10. A touch sensor comprising:
a capacitor comprising a first conductive layer, a second conductive layer having an opening, and an insulating layer between the first conductive layer and the second conductive layer,
wherein the opening in the second conductive layer and the first conductive layer overlap with each other in a region, and
wherein the first conductive layer is on a touch surface side of the touch sensor.

11. The touch sensor according to claim 10, further comprising a first transistor electrically connected to the first conductive layer.

12. A touch sensor module comprising:
the touch sensor according to claim 10; and
a first flexible printed circuit,
wherein the first flexible printed circuit is configured to supply a signal to at least one of the first conductive layer and the second conductive layer.

13. An electronic device comprising:
the touch sensor module according to claim 12; and
a housing,
wherein the touch sensor module is incorporated in the housing.

14. A touch panel comprising:
the touch sensor according to claim 10;
a first substrate;
a second substrate;
a display element;
a first layer; and
a second layer,
wherein the second substrate has a region overlapping with the first substrate,
wherein the display element, the first layer, and the second layer are between the first substrate and the second substrate,
wherein the second conductive layer is between the display element and the first conductive layer,
wherein the first layer is configured to transmit light in a specific wavelength range and has a region overlapping with the display element,
wherein the second layer is configured to block visible light,
wherein the first conductive layer has a region overlapping with the first layer and a region overlapping with the second layer,
wherein the second conductive layer has a region overlapping with the second layer,
wherein a region where the opening in the second conductive layer and the display element overlap with each other is included, and
wherein the opening in the second conductive layer and the first layer overlap with each other in a region.

15. The touch panel according to claim 14,
wherein the display element is a light-emitting element.

16. The touch panel according to claim 14,
wherein the first substrate and the second substrate each have flexibility.

17. A touch panel module comprising:
the touch panel according to claim 14;
a first flexible printed circuit; and
a second flexible printed circuit,
wherein the first flexible printed circuit is configured to supply a signal to at least one of the first conductive layer and the second conductive layer, and
wherein the second flexible printed circuit is configured to supply a signal to the display element.

18. An electronic device comprising:
the touch panel module according to claim 17; and
a housing,
wherein the touch panel module is incorporated in the housing.

* * * * *